US008748529B2

(12) United States Patent
Shimohara et al.

(10) Patent No.: US 8,748,529 B2
(45) Date of Patent: Jun. 10, 2014

(54) PIGMENT DISPERSION, INK COMPOSITION USING THE SAME, AND PRINTED MATERIAL

(75) Inventors: Norihide Shimohara, Kanagawa (JP); Ippei Nakamura, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 146 days.

(21) Appl. No.: 13/043,492

(22) Filed: Mar. 9, 2011

(65) Prior Publication Data

US 2011/0223395 A1 Sep. 15, 2011

(30) Foreign Application Priority Data

Mar. 12, 2010 (JP) .................................. 2010-056274

(51) Int. Cl.
*C08F 290/04* (2006.01)

(52) U.S. Cl.
USPC ................. 524/504; 524/88; 524/90; 524/92; 524/358

(58) Field of Classification Search
USPC .................. 524/504, 88, 90, 92, 358
See application file for complete search history.

(56) References Cited

U.S. PATENT DOCUMENTS

2009/0068575 A1 * 3/2009 Fujimaki et al. .................. 430/7

FOREIGN PATENT DOCUMENTS

| EP | 1816173 | | 8/2007 |
|----|---------|---|--------|
| EP | 2093265 | A | 8/2009 |
| JP | 2000-256570 | A | 9/2000 |
| JP | 2003-119414 | A | 4/2003 |
| JP | 2003-321628 | A | 11/2003 |
| JP | 2004-018656 | A | 1/2004 |
| JP | 2004-131589 | A | 4/2004 |
| JP | 2006-232987 | A | 9/2006 |
| JP | 2007-009117 | A | 1/2007 |
| JP | 2007-204664 | | 8/2007 |
| JP | 2008-266627 | | 11/2008 |
| JP | 2010-013630 | A | 1/2010 |
| WO | 2008-117803 | | 10/2008 |

OTHER PUBLICATIONS

English language translation of the following: Office action dated Jul. 24, 2013 from the SIPO in a Chinese patent application corresponding to the instant patent application. This office action translation is submitted now in order to supplement the understanding of patent document WO2008-117803.
English language translation of the following: Office action dated Jul. 23, 2013 from the JPO in a Japanese patent application corresponding to the instant patent application. This office action translation is submitted now in order to supplement the understanding of patent document JP2008-266627 and JP2007-204664.

* cited by examiner

*Primary Examiner* — Peter D Mulcahy
(74) *Attorney, Agent, or Firm* — SOLARIS Intellectual Property Group, PLLC

(57) ABSTRACT

A pigment dispersion including: 2 to 35% by mass of a pigment (a); 10 to 30 parts by mass of a polymer (b) with respect to 100 parts by mass of the pigment (a), the polymer (b) containing 5 to 30% by mass of a repeating unit represented by the following Formula (1) and having a weight average molecular weight of 10000 to 200000; and 15 to 50 parts by mass of a graft copolymer (c) having a polyalkylene imine chain or a polyallylamine chain in a main chain thereof and a polyester chain in a side chain thereof with respect to 100 parts by mass of the pigment (a), in which a total of the contents of the polymer (b) and the graft copolymer (c) is in the range of 25 to 70 parts by mass with respect to 100 parts by mass of the pigment (a).

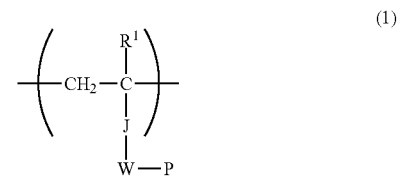

(1)

24 Claims, No Drawings an adverse effect on the ink dischargeability (ejectability), it is not preferred for inkjet recording to use an ink composition causing pigment aggregates or increase of viscosity.

PIGMENT DISPERSION, INK COMPOSITION USING THE SAME, AND PRINTED MATERIAL

CROSS-REFERENCE TO RELATED APPLICATION

This application claims priority under 35 USC 119 from Japanese Patent Application No. 2010-056274 filed on Mar. 12, 2010, the disclosure of which is incorporated by reference herein.

BACKGROUND OF THE INVENTION

1. Field of the Invention

The present invention relates to a pigment dispersion, an ink composition containing the pigment dispersion and a printed material.

2. Description of the Related Art

In the case of using a pigment as a colorant in various coloring compositions, it is important to ensure the dispersibility and the dispersion stability of the pigment as a solid. A curable composition or an ink composition having a uniform hue can be obtained by using a pigment dispersion excellent in pigment dispersibility and dispersion stability. Particularly, a pigment of excellent in light fastness is used generally as a colorant for a ink composition. However, in a case where the pigment involves a problem in view of the pigment dispersibility, this causes various problems, for example, of rendering the tone uneven or lowering the dischargeability in a case in which an ink composition is used for an inkjet recording method.

In recent years, an inkjet recording method has attracted attention as an image recording method of forming images on a recording medium based on image data signals. The inkjet recording method has advantages of less generating noises, and is also capable of recording highly fine images at a low running cost by spotting extremely small liquid droplets.

According to the inkjet recording method, while printing is possible not only to plain paper but also to a none-liquid-absorbing recording medium such as a plastic sheet or a metal plate, it is desired to shorten the time necessary for drying and curing for attaining higher speed and higher image quality upon printing. For this purpose, one of inkjet methods involves a recording method of using an ink that can be cured in a short time by irradiation of actinic energy rays as an inkjet recording ink. According to this method, clear and sharp images can be formed by irradiating actinic energy rays just after printing thereby curing ink droplets. For such a curable inkjet composition, high pigment dispersability and aging stability thereof are demanded for forming highly fine images of excellent coloring property and stably discharging the ink composition.

For providing the ink composition with a clear tone and a high coloring power, it is essential that the pigment is made finely particulate. Particularly, in an ink composition used for inkjet recording, since discharged ink droplets give a significant effect on the clearness and sharpness of images, the amount of the discharged liquid droplets is decreased and it is essential to use particles having finer diameter than the thickness of the cured ink film formed from the ink composition. However, as the pigment particles are made finer for obtaining a higher coloring power, fine particles becomes difficult to be dispersed and aggregates are likely to be formed. Further, this also results in a problem such that viscosity of the ink composition is increased by excessive addition of a dispersing agent. Since generation of pigment aggregates and increase in the viscosity of the ink composition gives an adverse effect on the ink dischargeability (ejectability), it is not preferred for inkjet recording to use an ink composition causing pigment aggregates or increase of viscosity.

A method of manufacturing an ink composition containing a fine pigment dispersion includes a method of previously preparing a concentrated pigment dispersion (also referred to as a mill base) and diluting the obtained mill base with a desired liquid such as a solvent or a polymerizable compound, thereby obtaining an ink composition. However, since the mill base is a concentrated dispersion of pigments, the pigments strongly interact with each other, so that viscosity tends to increase during dispersion or storage. Increase in viscosity of the mill base is not preferred since this causes increase in the burden on a manufacturing machine, as well as results in lowering of the manufacturing stability due to circulation failure or lowering of the re-dispersibility upon ink preparation. From the view point described above, there is requirement to develop a mill base having sufficient fluidity and storage stability, and an ink composition used for inkjet having sufficient fluidity, in which a finely particulate pigment is dispersed stably, and which is also excellent curability.

For the dispersing agent for obtaining a stable ink composition, various proposals have been made as described below. That is, an ink composition using a pigment derivative as a dispersing agent for improving the affinity with a pigment (for example, refer to Japanese patent application laid-open (JP-A) Nos. 2003-119414 and 2004-18656); an ink composition using a polymer having a basic group as a dispersing agent for a specified pigment such as a phthalocyanine-type or a quinacridone-type (for example, refer to JP-A No. 2003-321628); an organic solvent-free ink composition containing a dispersing agent such as a poly(ethyleneimine)-poly(12-hydroxystearic acid) graft polymer together with a specified monomer for dissolving the dispersing agent (for example, refer to JP-A No. 2004-131589); an ink composition using a graft copolymer having a heterocyclic residue that forms an organic pigment as a dispersing agent (for example, refer to JP-A No. 2007-9117); an ionic compound-containing powder dispersion using a pigment dispersant having a basic end and another pigment dispersant in combination (for example, refer to JP-A No. 2006-232987); and a pigment dispersion composition using a pigment dispersant having an acidic group and a pigment dispersant having basic group in combination (for example, refer to JP-A No. 2000-256570) have been disclosed.

The pigment dispersant, the pigment dispersion or the ink composition disclosed in these documents described above may enable to disperse pigments more finely and the stability of the ink composition may be more improved than previous ones, but there is still a room for the improvement of fluidity of the ink composition in a high concentration range and stability of the pigment ink composition. Further, with respect an ink composition having excellent stability, improvement in stability of the mill base has been required.

The present invention aims to address above-described problems and to achieve the following objects.

An object of the invention is to provide a pigment dispersion which contains a finely dispersed pigment and has excellent fluidity in a high concentration region and excellent dispersion stability under a diluted state even during a long-term storage.

Another object of the invention is to provide an ink composition in which pigments are finely dispersed and dispersion stability of the pigment is excellent even after a long-term storage or a repeated change of temperature, so that the ink composition is favorable for inkjet recording, and to provide a printed material produced by using the same.

The inventors of the invention have devotedly and extensively conducted investigations, and as a result, they found that a pigment dispersion having excellent dispersibility and dispersion stability of the pigment is obtained by using a combination of two types of specific polymers and an ink composition capable of effective suppression of decrease in dispersion stability that is caused after a long-term storage or even after a repeated change of temperature is obtained by using the pigment dispersion. Thus, the invention has been completed.

SUMMARY OF THE INVENTION

According to a first aspect of the present invention, there is provided a pigment dispersion which includes:

from 2 to 35% by mass of a pigment (a);

from 10 to 30 parts by mass of a polymer (b) with respect to 100 parts by mass of the pigment (a), the polymer (b) containing 5 to 30% by mass of a repeating unit represented by Formula (1) below and having a weight average molecular weight of 10000 to 200000; and from 15 to 50 parts by mass of a graft copolymer (c) having a polyalkylene imine chain or a polyallylamine chain in a main chain thereof and a polyester chain in a side chain thereof with respect to 100 parts by mass of the pigment (a), in which a total of the contents of the polymer (b) and the graft copolymer (c) is in the range of from 25 to 70 parts by mass with respect to 100 parts by mass of the pigment (a);

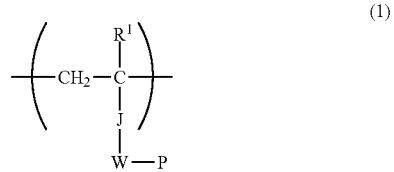

In Formula (1), $R^1$ represents a hydrogen atom or a methyl group. J represents —CO—, —COO—, —CONR$^2$—, —OCO— or a phenylene group and $R^2$ represents a hydrogen atom, an alkyl group, an aryl group or an aralkyl group. W represents a single bond or a divalent linking group. P represents a heterocyclic residue having a heterocyclic ring contained in an organic pigment.)

DETAILS DESCRIPTION OF THE INVENTION

Hereinafter, specific exemplary embodiments of the present invention will be described in detail.

According to the following first aspect to a fifteenth aspect of the present invention, there are provided pigment dispersions, ink compositions containing the pigment dispersion and printed materials as set forth below. However, the present invention is not limited thereto.

<1> A pigment dispersion which includes:

from 2 to 35% by mass of a pigment (a);

from 10 to 30 parts by mass of a polymer (b) with respect to 100 parts by mass of the pigment (a), the polymer (b) containing 5 to 30% by mass of a repeating unit represented by above Formula (1) and having a weight average molecular weight of 10000 to 200000; and from 15 to 50 parts by mass of a graft copolymer (c) having a polyalkylene imine chain or a polyallylamine chain in a main chain thereof and a polyester chain in a side chain thereof with respect to 100 parts by mass of the pigment (a), in which a total of the contents of the polymer (b) and the graft copolymer (c) is in the range of from 25 to 70 parts by mass with respect to 100 parts by mass of the pigment (a);

<2> The pigment dispersion according to <1> in which P in Formula (1) is a heterocyclic residue having a partial structure of any pigment selected from the group consisting of a quinacridone pigment, a benzimidazolone azo pigment, a dioxazine pigment, a naphthol AS pigment, a phthalocyanine pigment, an anthraquinone pigment, and a perylene pigment and containing a structure in which 2 to 5 heterocyclic rings are fused.

<3> The pigment dispersion according to <1> or <2> in which P in Formula (1) above is a heterocyclic residue having 7 to 20 carbon atoms.

<4> The pigment dispersion according to any one of <1> to <3> in which the partial structure is any partial structure selected from the group consisting of benzimidazolone, carbazole, acridone, anthraquinone, phthalimide, and naphthalimide.

<5> The pigment dispersion according to any one of <1> to <4> in which the polymer (b) has a repeating unit containing a basic functional group.

<6> The pigment dispersion according to any one of <1> to <5> in which the polymer (b) is a graft copolymer.

<7> The pigment dispersion according to any one of <1> to <6> in which the pigment (a) is a quinacridone pigment.

<8> The pigment dispersion according to any one of <1> to <7> in which P in Formula (1) is a heterocyclic residue having a heterocyclic ring with an identical or similar structure to a heterocyclic ring included in quinacridone.

<9> The pigment dispersion according to any one of <1> to <8> in which a value ((B)/(C)) obtained by dividing a content (B) of the polymer (b) by a content (C) of the graft copolymer (c) is in a range of from 0.2 to 1.3.

<10> The pigment dispersed product according to any one of <1> to <9> further containing a polymerizable compound (d).

<11> An ink composition which contains the pigment dispersion according to any one of <1> to <10>.

<12> The ink composition according to <11> which further contains 50 to 95% by mass of at least one of the polymerizable compound (d) or an organic solvent (e), and a content of the pigment (a) is in a range of from 2 to 20% by mass.

<13> A composition for inkjet printing including the ink composition according to <11> or <12> which is <14> The ink composition according to any one of <11> to <13>, further containing a polymerization initiator.

<15> A printed material produced by printing on a printing medium with an inkjet printer using the ink composition according to any one of <11> to <14>.

According to the aspect <1> of the invention, there may be provided a pigment dispersion which contains a finely dispersed pigment and has excellent fluidity in a high concentration region and excellent dispersion stability in a diluted state during a long-term storage.

According to the aspect <2> of the invention, dispersibility and dispersion stability of the pigment may be improved.

According to the aspect <3> of the invention, dispersibility and dispersion stability of the pigment may be improved.

According to the aspect <4> of the invention, dispersibility and dispersion stability of the pigment may be improved.

According to the aspect <5> of the invention, dispersibility and dispersion stability of the pigment may be improved.

According to the aspect <6> of the invention, dispersibility and dispersion stability of the pigment may be improved.

According to the aspect <7> of the invention, dispersibility and dispersion stability of the pigment may be improved.

According to the aspect <8> of the invention, dispersibility and dispersion stability of the pigment may be improved.

According to the aspect <9> of the invention, dispersibility and dispersion stability of the pigment may be improved.

According to the aspect <10> of the invention, there may be provided a curable pigment dispersion.

According to the aspect <11> of the invention, there may be provided an ink composition in which a pigment is finely dispersed and dispersion stability of the pigment is excellent even after a long-term storage or a repeated change of temperature, so that the ink composition is favorable for inkjet recording.

According to the aspect <12> of the invention, there may be provided a curable ink composition.

According to the aspect <13> of the invention, there may be provided a ink composition that is favorably used for inkjet.

According to the aspect <14> of the invention, there may be provided a curable ink composition having improved curing sensitivity.

According to the aspect <15> of the invention, there may be provided a high quality printed material.

Pigment Dispersion

The pigment dispersion of the invention is a pigment dispersion which includes:

from 2 to 35% by mass of a pigment (a);

from 10 to 30 parts by mass of a polymer (b) with respect to 100 parts by mass of the pigment (a), the polymer (b) containing 5 to 30% by mass of a repeating unit represented by above Formula (1) and having a weight average molecular weight of 10000 to 200000; and from 15 to 50 parts by mass of a graft copolymer (c) having a polyalkylene imine chain or a polyallylamine chain in a main chain thereof and having a polyester chain in a side chain thereof with respect to 100 parts by mass of the pigment (a), in which a total of the contents of the polymer (b) and the graft copolymer (c) is in the range of from 25 to 70 parts by mass with respect to 100 parts by mass of the pigment (a);

The pigment dispersion of the invention further containing the polymerizable compound (d) is also a preferred aspect of the invention.

Even if the pigment dispersion of the invention contains the pigment in high concentration, an increase in viscosity is small and high dispersibility of pigment is achieved by a combination effect of the specific polymer (b) and the graft copolymer (c), so that the dispersion stability may be maintained over a long period of time. Even if a fine pigment is selected as a pigment, a pigment dispersed product with improved coloring properties and colorability may be obtained.

Since the pigment dispersion of the invention has good dispersibility and dispersion stability, it may be used for various applications by diluting it. For example, from the viewpoint of improving the productivity of the pigment dispersion, a process of preparing once a concentrated pigment dispersion (mill base) and then diluting it in order to adjust liquid properties, colorability, curability, and cured film properties allows for various applications such as ink compositions and resists for color filters. Particularly, the ink composition containing the pigment dispersed product of the invention is excellent in dispersion stability even if it has a low-viscosity, so that it is excellent in discharging stability when an image is printed using an inkjet printer.

The polymerizable compound (d) in addition to the pigment (a), the specific polymer (b), and the specific graft copolymer (c) is added to the pigment dispersion of the invention, so that the dispersion is favorable as an ink composition curable by irradiation with an active energy ray or heating, particularly as an ink composition for inkjet printing. The ink composition for inkjet using the pigment dispersion of the invention has a clear color tone and high coloring power, so that a high-definition image may be formed. Using the ink composition for inkjet, a high-quality image may be directly formed on a none-liquid-absorbing recording medium, based on digital data, so that the ink composition for inkjet is favorably used for making a printed material having a large area.

In addition to the ink composition for inkjet printing, the pigment dispersion of the invention, when prepared as an ink composition mixed with a chemical substance to achieve a desired performance, may form sharp images having excellent coloring properties thereby obtaining high-quality printed material when the ink composition is used in normal printing.

That is, since the ink composition of the invention is excellent in dispersibility in an organic medium, it may form images having a sharp hue also in a case in which it is used for a non-curable ink. For example, a normal ink composition containing a film forming polymer, a colorant, and a solvent in which the resultant coating film is cured by removal of the solvent after coating, such as a solvent ink using a volatile solvent such as cyclohexanone, is a preferred aspect of the invention.

The ink composition made using the pigment dispersion of the invention is useful not only as an ink composition but also as a light molding material and it may be favorably used for the production of a resist, a color filter, and an optical disc. The pigment dispersed product of the invention may be favorably used over an extensive range of applications such as those requiring good coloring properties or those requiring a light-fast colorant, such as a nanoimprint composition or a surface coating agent.

Hereinafter, each component in the pigment dispersion of the invention will be explained in detail.

<Pigment (a)>

The pigment dispersion of the invention includes a pigment as an essential component. In the pigment dispersion of the invention, the pigment is dispersed uniformly and stably in the pigment dispersion by a combination effect of the specific polymer (b) and the specific graft copolymer (c) as described below even in a case in which the particle diameter of the pigment used is small. As a result, images that are excellent in coloring properties, sharpness, and weather resistance may be formed. The inkjet ink composition that is excellent in discharging stability is obtained by reducing coarse secondary particles as much as possible.

Since the pigment dispersion of the invention contains the pigment, it may be favorably used for uses requiring weather resistance for the colorant, for example, a colored composition such as an ink composition. Further, in the case of applying the pigment dispersion as a coloring component for various compositions, a dye may also be used in combination with the pigment in order to control the hue or the like.

The pigment contained in the pigment dispersion of the invention is not particularly limited and various known pigments may be appropriately selected depending on the purpose. Particularly, the pigment dispersion of the invention is excellent in adsorptive properties to an organic pigment because of the effects of the heterocyclic residue contained in the specific polymer (b), so that it is preferable that the pigment dispersion contains the organic pigment.

The organic pigment is not particularly limited and it may be appropriately selected depending on the purpose. Known organic pigments are preferred from the viewpoint of the similarity of the chemical structure of the pigment and the pigment dispersant. Examples of the pigment to be used in the invention include those described in "Dictionary of Pigments" (in English) edited by Seishiro Itoh, (2000), W. Herbst, K. Hunger, "Industrial Organic Pigments", and JP-A Nos. 2002-12607, 2002-188025, 2003-26978, and 2003-342503.

Examples of the organic pigment include a yellow pigment, a magenta pigment, a cyan pigment, a green pigment, an orange pigment, a brown pigment, a violet pigment, and a black pigment.

The yellow pigment is a pigment exhibiting yellow color, and examples thereof include a monoazo pigment, a disazo pigment, a nonebenzidine azo pigment, an azo lake pigment, a condensed azo pigment, an acidic dye lake pigment, a basic dye lake pigment, an anthraquinone pigment, a quinophthalone pigment, a pyrazolone pigment, an acetolone pigment, a metal complex salt pigment, a nitroso pigment, a metal complex azomethine pigment, a benzimidazolone pigment, and an isoindoline pigment. Among them, examples of the pigment that may be preferably used in the invention include C.I. Pigment Yellow (hereinafter, abbreviated to PY) 1, PY3, PY12, PY13, PY14, PY16, PY17, PY18, PY24, PY60, PY74, PY83, PY93, PY94, PY95, PY97, PY100, PY109, PY110, PY115, PY117, PY120, PY128, PY138, PY139, PY150, PY151, PY153, PY154, PY155, PY166, PY167, PY173, PY175, PY180, PY181, PY185, PY194, PY213, PY214, and PY219. Among them, benzimidazolone pigments such as a monoazo pigment, a disazo pigment, or an acetolone pigment and isoindoline are preferable, and PY74, PY120, PY151, PY155, PY180, and PY185 are more preferable.

The magenta pigment is a pigment exhibiting red or magenta color, and examples thereof include a monoazo pigment, a β-naphthol pigment, a disazo pigment, an azo lake pigment, a condensed azo pigment, an acidic dye lake pigment, a basic dye lake pigment, an anthraquinone pigment, a thio indigo pigment, a perinone pigment, a perylene pigment, a quinacridone pigment, an isoindolinone pigment, an alizarin lake pigment, a naphtholone pigment, a napthol AS lake pigment, a naphthol AS pigment, and a diketopyrrolopyrrole pigment.

Among them, examples of the pigment that may be preferably used in the invention include C.I. Pigment Red (hereinafter, abbreviated to PR) 1, PR2, PR3, PR4, PR5, PR6, PR21, PR38, PR42, PR46, PR53:1, PR57:1, PR52:1, PR46, PR48, PR81, PR83, PR88, PR144, PR149, PR166, PR179, PR178, PR190, PR224, PR123, PR224, PR19, PR122, PR202, PR207, PR209, PR180, PR83, PR170, PR171, PR172, PR174, PR175, PR176, PR177, PR179, PR185, PR194, PR208, PR214, PR220, PR221, PR242, PR247, PR254, PR255, PR256, PR262, PR268, PR264, PR269, PR272, and CI Pigment Violet (PV) 19. Among them, a quinacridone pigment is preferable, and PR42, PR122, PR202, PR209, and PV19 are preferable.

The cyan pigment is a pigment exhibiting blue or cyan color, and examples thereof include a disazo pigment, a phthalocyanine pigment, an acidic dye lake pigment, a basic dye lake pigment, an anthraquinone pigment, and an alkali blue pigment. Examples of the pigment that may be preferably used in the invention include C.I. Pigment Blue (hereinafter, abbreviated to PB) 1, PB15, PB15:1, PB15:2, PB15:3, PB15:4, PB15:6, PB16, PB18, PB24, PB25, PB60, and PB79. Among them, a copper phthalocyanine pigment is preferable, and PB15, PB15:1, PB15:2, PB15:3, PB15:4, and PB15:6 are preferable.

The green pigment is a pigment exhibiting green color, and examples thereof include a phthalocyanine pigment and a metal complex pigment. Examples of the pigment that may be preferably used in the invention include C.I. Pigment Green (hereinafter, abbreviated to PG) 7, PG8, PG10, and PG 36.

The orange pigment is a pigment exhibiting orange color and examples thereof include an isoindoline pigment, an anthraquinone pigment, a β-naphthol pigment, a naphthol AS pigment, an isoindolinone pigment, a perinone pigment, a disazo pigment, a quinacridone pigment, an acetolone pigment, and a pyrazolone pigment. Examples of the pigment that may be preferably used in the invention include C.I. Pigment Orange (hereinafter, abbreviated to PO) 2, PO3, PO4, PO5, PO13, PO15, PO16, PO22, PO24, PO34, PO36, PO38, PO43, PO48, PO49, PO51, PO55, PO60, PO61, PO62, PO64, PO66, PO72, and PO74.

The brown pigment is a pigment exhibiting brown color, and examples thereof include naphtholone pigments such as C.I. Pigment Brown (hereinafter, abbreviated to PBr)25 and PBr32.

The violet pigments are pigments exhibiting violet color, and examples thereof include a naphtholone pigment, a perylene pigment, a naphthol AS pigment, and a dioxazine pigment. Examples of the pigment that may be preferably used in the invention include C.I. Pigment Violet (hereinafter, abbreviated to PV)13, PV17, PV23, PV29, PV32, PV37, and PV50.

The black pigment is a pigment exhibiting black color, and examples thereof include carbon black, an indazine pigment, and a perylene pigment. Examples that may be used in the invention include C.I. Pigment Black (hereinafter, abbreviated to PBk)1, PBk7, PBk31, and PBk32.

Among these pigments, quinacridone pigments are more preferable. Particularly, unsubstituted-quinacridones such as PR42, PR122, PR202, PR209, and PV19; substituted quinacridones; and mixed crystals of unsubstituted and/or substituted quinacridones are preferably used.

Since the coloring property is more excellent as the average particle diameter is smaller for the pigment other than that of white color, in a case of applying the pigment dispersion of the invention to a pigment dispersion other than that of the white color, the average particle diameter of the pigment contained in the pigment dispersion is in the range of preferably from 0.01 μm to 0.4 μm, and more preferably from 0.02 μm to 0.3 μm. Further, the maximum particle diameter of the pigment is preferably 3 μm or less, and more preferably 1 μm or less. The particle diameter of the pigment can be controlled, for example, by selecting the pigment, the dispersing agent, and the dispersion medium, and setting dispersion conditions and filtration conditions. Further, in a case of preparing the pigment dispersion of the invention as a white pigment dispersion which is applicable, for example, to a white ink composition, the average particle diameter of the pigment contained in the pigment dispersion is in the range of preferably from 0.05 μm to 1.0 μm, and more preferably from 0.1 μm to 0.4 μm, from a view point of providing a sufficient concealing power. Also for the case of preparing the white pigment dispersion, the maximum particle diameter of the pigment is preferably 3 μm or less, and more preferably 1 μm or less.

By the control for the particle diameter as described above, for example, storage stability of the pigment dispersion, transparency of the pigment dispersion, and curing sensitivity in a case of applying the pigment dispersion to the curable composition can be maintained. Further, the head nozzle clogging can be suppressed also in a case of applying the pigment dispersion to the ink composition used for inkjet.

Since the pigment dispersion composition of the invention contains a specific polymer (b) and a specific graft copolymer (c) that have excellent pigment dispersability and dispersion stability as a pigment dispersing agent, uniform and stable pigment dispersion is obtained also in a case of using a fine particulate pigment.

The particle diameter of the pigment (a) in the pigment dispersion can be measured by a known measuring method. Specifically, the particle diameter of the pigment can be measured by a centrifugal sedimentation photo-transmission method, an X-ray transmission method, a laser diffraction-scattering method, or a dynamic photo scattering method.

The concentration of the pigment (a) in the pigment dispersion of the invention is in the range of from 2 to 35% by mass, and more preferably from 2 to 25% by mass. In a case of preparing the pigment dispersion as a concentrated pigment dispersion (mill base), the concentration of the pigment in the mill base is in the range of preferably from 10 to 35% by mass, and more preferably from 15 to 35% by mass.

For the dispersion of the pigment (a), any of known dispersion apparatus, for example, a ball mill, a sand mill, a beads mill, an attritor, a roll mill, a jet mill, a homogenizer, a paint shaker, a kneader, an agitator, a Henschel mixer, a colloid mill, a supersonic homogenizer, a pearl mill, and a wet jet mill can be used. The specific polymer to be described below is preferably added upon dispersion of the pigment.

Specific Polymer (b)

The pigment dispersion of the invention contains a polymer (b) having from 5 to 30% by mass of repeating units represented by above Formula (1) and having a weight average molecular weight of from 10,000 to 200,000.

The specific polymer (b) may exhibit a function as a pigment dispersant. Thus, it is particularly preferable to use the specific polymer (b) as the pigment dispersant.

The specific polymer (b) is added to the pigment dispersion of the invention, so that a pigment dispersion having high affinity with the pigment may be obtained. It is presumed that this is because Van-der-Waals interaction originated from the heterocyclic residue P in the repeating unit represented by Formula (1) acts and resultantly adsorptive properties with the pigment become very good.

Since the specific polymer (b) is a polymeric compound having a specific repeating structure unit, the dispersion may be stabilized even in a non-aqueous organic medium by a steric repulsion effect of the polymer chain.

First, the repeating unit represented by Formula (1) contained in the specific polymer (b) will be explained in detail.

Repeating Unit Represented by Formula (1)

The above-described specific polymer (b) contains the repeating unit represented by the following Formula (1).

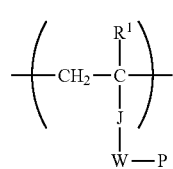

(1)

In Formula (1), $R^1$ represents a hydrogen atom or a methyl group.

In Formula (1), J represents —CO—, —COO—, —CONR$^2$—, —OCO—, or phenylene group and, among them, —COO—, —CONR$^2$—, and phenylene group is preferred. $R^2$ represents a hydrogen atom, an alkyl group (for example, a methyl group, an ethyl group, a n-propyl group, an i-propyl group, and a n-butyl group), an aryl group (for example, a phenyl group), and an aralkyl group, and the hydrogen atom or the alkyl group having 1 to 4 carbon atoms is preferred. Among them, J represents preferably —COO—, —CONH—, or a phenylne group. $R^2$ represents a hydrogen atom, an alkyl group, an aryl group, or an aralkyl group. Among these, a hydrogen atom and an alkyl group having 1 to 4 carbon atoms are preferred.

In formula (1), W represents a single bond or a bivalent linking group.

The bivalent linking group represented by W includes, for example, a linear, branched, or cyclic alkylene group and an aralkylene group. The bivalent linking group may have a substituent.

As the alkylene group represented by W, an alkylene group having 1 to 10 carbon atoms is preferred, and an alkylene group having 1 to 4 carbon atoms is more preferred. Specific examples of the alkylene group include a methylene group, an ethylene group, a propylene group, a butylenes group, a pentylene group, a hexylene group, an octylene group, and a decylene group. Among them, the methylene group, the ethylene group, the propylene group, etc. are particularly preferred.

As the aralkylene group represented by W, an aralkylene group having 7 to 13 carbon atoms is preferred. Specific examples of the aralkylene group include a benzylidene group and a cinnamylidene group.

As the arylene group represented by W, an arylene group having 6 to 12 carbon atoms is preferred. Specific examples of the arylene group include a phenylene group, a cumenylene group, a mesitylene group, a tolylene group, and a xylylene group. Among them, the phenylene group is particularly preferred.

In the bivalent linking group represented by W, —NR$^3$—, —COO—, —OCO—, —O—, —SO$_2$NH—, —NHSO$_2$—, —NHCOO—, —OCONH—, —NHCONH—, —CONH— or a group derived from a heterocyclic ring may intervene as a bonding group. Here, $R^3$ preferably represents a hydrogen atom or an alkyl group, and the hydrogen atom, a methyl group, an ethyl group, a propyl group, etc. are preferred.

W preferably represents a single bond; an alkylene group having 1 to 8 carbon atoms; an alkylene group having 1 to 8 carbon atoms, in which —COO—, —O—, —NHCOO—, —OCONH—, or —NHCONH— or any combination of these groups may intervene as a bonding group; or a 2-hydroxypropylene group.

In Formula (1), P represents a heterocyclic residue having a heterocyclic ring contained in an organic pigment. Here, "a heterocyclic residue having a heterocyclic contained in a organic pigment" represented by P means a group containing a heterocyclic structure identical or similar to the heterocyclic structure present in a molecule structure of an organic pigment. Examples of the heterocyclic residue include a heterocyclic structure identical or similar to the heterocyclic structure that is contained as a partial skeleton of an organic pigment, or a pigment mother nucleus (chromophoric group).

Specific examples of the organic pigment that is constituted by containing the heterocyclic residue represented by P include known organic pigments. Among them, the organic pigments such as a phthalocyanine type, an insoluble azo type, an azo lake type, an anthraquinone type, a quinacridone type, a dioxadine type, a diketopyrrolopyrrole type, an anthrapyrimidine type, an anthanthrone type, an indanthrone type, a flavanthrone type, a perynone type, a perylene type, a thioindigo type, or a quinophthalone type organic pigments are preferable. The organic pigments such as a quinacridone type, benzimidazolone azo type, a dioxazine type, a naphthol AS type, a phthalocyanine type, an anthraquinone type, and a perylene type organic pigment are more preferable. The organic pigments such as a quinacridone type, a benzimidazolone azo type, an anthraquinone type, or a dioxazine type organic pigment are particularly preferable.

The heterocyclic residue represented by P preferably has a partial structure of any of the pigments selected from the group consisting of a quinacridone pigment, a benzimidazolone azo pigment, a dioxazine pigment, a naphthol AS pigment, a phthalocyanine pigment, an anthraquinone pigment, and a perylene pigment. More preferable examples thereof include those groups formed by removing one hydrogen atom from the heterocyclic residues such as thiophene, furan, xanthene, pyrrole, imidazole, benzimidazole, isoindoline, isoindolinone, benzimidazolone, indole, quinoline, carbazole, acridine, acridone, quinacridone, anthraquinone, phthalimide, quinaldine, quinophthalone, naphthalimide, and quinaldine. Among them, P is a heterocyclic residue containing a structure in which two to five heterocyclic rings are condensed, and particularly, examples of the heterocyclic residue preferably includes those groups formed by removing one hydrogen atom from a heterocyclic ring such as benzimidazole, isoindoline, isoindolinone, benzimidazolone, indole, quinoline, carbazole, acridine, acridone, quinacridone, anthraquinone, phthalimide, quinaldine, quinophthalone, naphthalimide, and quinaldine. The carbon number of these heterocyclic residues is preferably from 7 to 20. In the invention, those groups formed by removing one hydrogen atom from any of the heterocyclic rings selected from the group consisting of quinacridone, benzimidazolone, indole, quinoline, carbazole, acridine, acridone, anthraquinone, phthalimide, and naphthalimide are most preferable. These partial structures may have a substituent.

The heterocyclic residue represented by P particularly preferably includes a heterocyclic structure identical or similar to the heterocyclic structure of the pigment (a). Specifically, in a case where the pigment (a) is a quinacridone pigment, P preferably represents a residue of a heterocyclic ring having a heterocyclic structure identical or similar to that of the heterocyclic ring of quinacridone, namely quinacridone, acridone and anthraquinone, etc. similar to quinacridone in terms of two benzene rings and a six-membered ring that connects them, and an acyl group thereof.

The specific polymer (b) in the invention is preferable synthesize by introducing a monomer which gives the repeating unit represented by Formula (1) in a homogeneous polymerization reaction from the viewpoint of production stability. The monomer that gives the repeating unit of Formula (1) having a partial skeleton of the pigment tends to have low solubility. However, the repeating unit of Formula (1) may be stably introduced to the specific polymer (b) at a desired composition ratio by synthesizing the specific polymer (b) in the homogeneous polymerization reaction.

P in the specific polymer (b) may be synthesized by using and introducing a monomer having a structure in which hydrogen is removed from the pigment molecules. However, in this case, a procedure of introducing a monomer, which provides a repeating unit represented by Formula (1), bonded to only the surface of pigment particles in a heterogeneous polymerization reaction, or a procedure of reacting a polymer not containing the repeating unit represented by Formula (1) with pigment particles may make it difficult to stably control an introduction rate of the repeating unit of Formula (1).

Preferable specific examples of the monomer providing the repeating unit represented by Formula (1) include the monomers (exemplified monomers: M-1 to M-19) described below. However, the invention is not restricted to them.

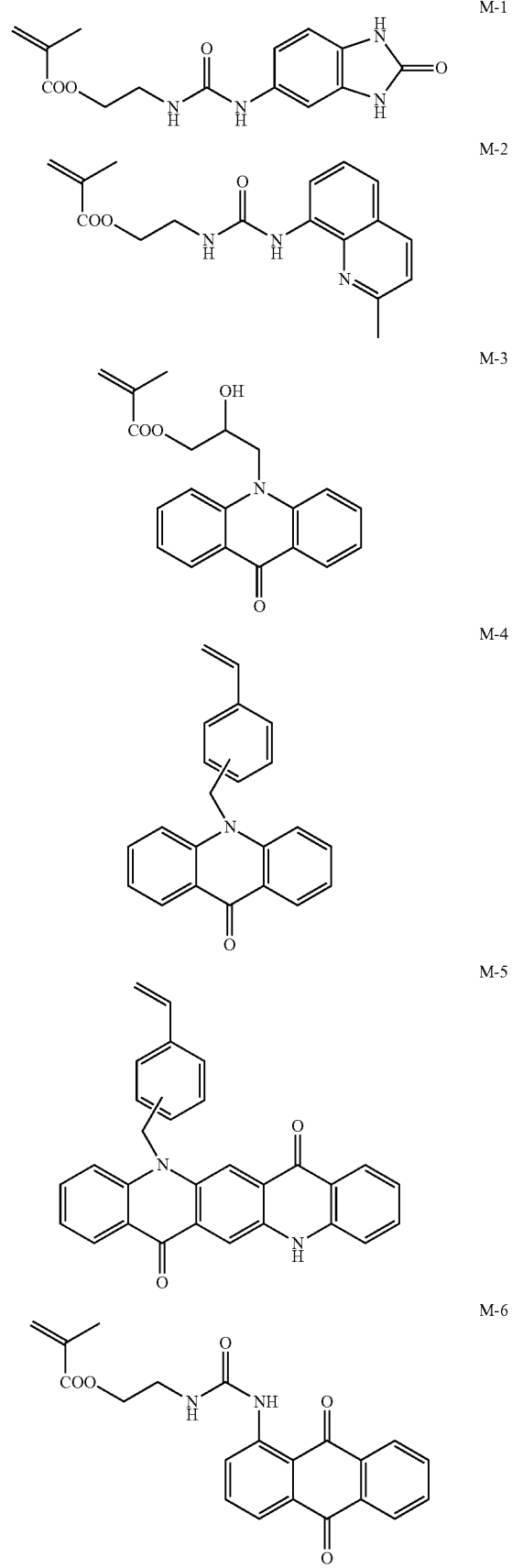

M-7
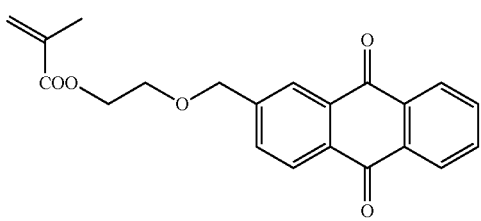
M-8
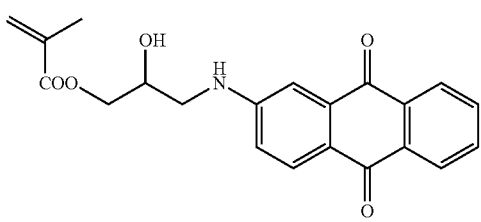
M-9
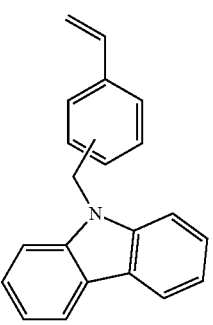
M-10
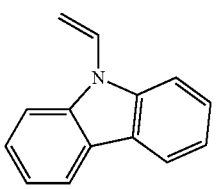
M-11
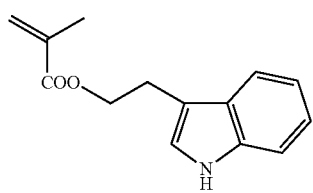
M-12
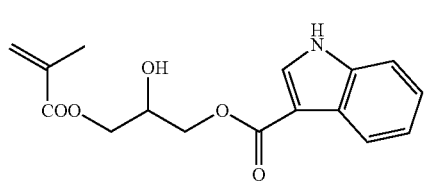
M-13
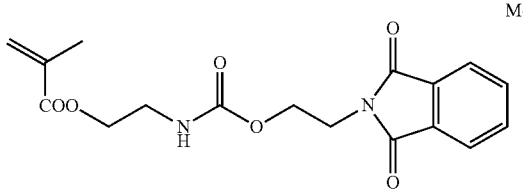
M-14
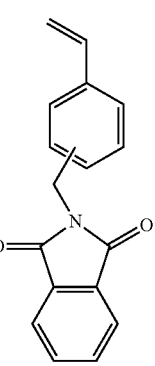
M-15
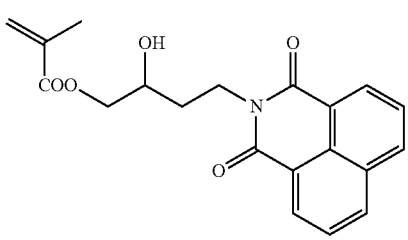
M-16
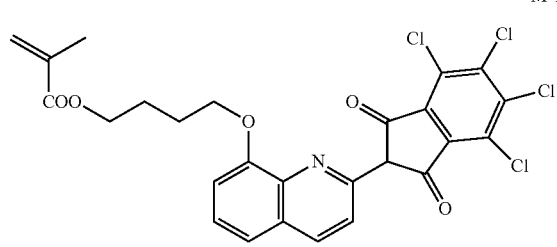
M-17
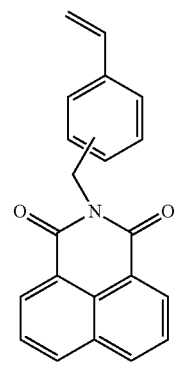
M-18
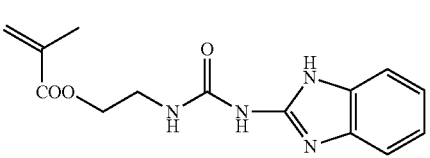

M-19

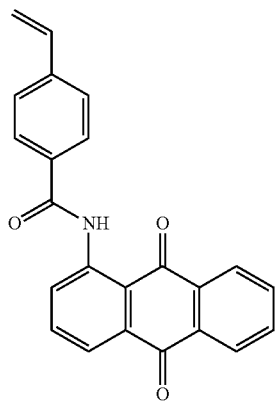

A content of the repeating unit of Formula (1) contained in the specific polymer (b) is in the range of preferably from 5 to 30% by mass, more preferably from 5 to 25% by mass, and most preferably from 5 to 20% by mass of the specific polymer (b) from the viewpoint of the solubility of the pigment dispersant in the organic solvent or the monomer, synthetic aptitude, and dispersibility.

As the combination of the pigment (a) and the repeating unit of Formula (1) in the specific polymer (b), the combination of a quinacridone pigment (the pigment (a)) and a structure in which any of acridone, anthraquinone, and naphthalimide is included in a partial skeleton (the repeating unit of Formula (1)) is preferable, and the combination of a quinacridone pigment (the pigment (a)) and a structure in which either acridone or anthraquinone is included in a partial skeleton (the repeating unit of Formula (1)) is particularly preferable.

It is preferable that the specific polymer (b) has a repeating unit containing a basic functional group. It is presumed that the acid-base interaction between the introduced basic functional group and an acid radical on the surface of the pigment (a) is caused, so that adsorptive properties of the specific polymer (b) to the pigment (a) are improved. An amino group is preferable as the basic functional group, and a secondary amino group and a tertiary amino group are preferred.

Examples of the monomer that provides the repeating unit having a basic functional group include the following monomers. Specific examples thereof include N,N-dimethylaminoethyl(meth)acrylate, N,N-dimethylaminopropyl(meth)acrylate, 1-(N,N-dimethylamino)-1,1-dimethylmethyl(meth)acrylate, N,N-dimethylaminohexyl(meth)acrylate, N,N-diethylaminoethyl(meth)acrylate, N,N-diisopropylaminoethyl(meth)acrylate, N,N-di-n-butylaminoethyl(meth)acrylate, N,N-di-i-butylaminoethyl(meth)acrylate, N-tert-butylaminoethylmethacrylate, morpholinoethyl(meth)acrylate, piperidinoethyl(meth)acrylate, 1-pyrrolidinoethyl(meth)acrylate, N,N-methyl-2-pyrrolidylaminoethyl(meth)acrylate, N,N-methylphenylaminoethyl(meth)acrylate, 2-tert-butylaminoethylmethacrylate (the monomers mentioned above are (meth)acrylates); dimethyl(meth)acrylamide, diethyl(meth)acrylamide, diisopropyl(meth)acrylamide, di-n-butyl(meth)acrylamide, di-i-butyl(meth)acrylamide, morpholino(meth)acrylamide, piperidino(meth)acrylamide, N-methyl-2-pyrrolidyl(meth)acrylamide, and N,N-methylphenyl(meth)acrylamide (the monomers mentioned above are (meth)acrylamides); 2-(N,N-dimethylamino)ethyl(meth)acrylamide, 2-(N,N-diethylamino)ethyl(meth)acrylamide, 3-(N,N-diethylamino)propyl(meth)acrylamide, 3-(N,N-dimethylamino)propyl(meth)acrylamide, 1-(N,N-dimethylamino)-1,1-dimethylmethyl(meth)acrylamide, and 6-(N,N-diethylamino)hexyl(meth)acrylamide (the monomers mentioned above are aminoalkyl(meth)acrylamides); p-vinylbenzyl-N,N-dimethylamine, p-vinylbenzyl-N,N-diethylamine, and p-vinylbenzyl-N,N-dihexylamine (the monomers mentioned above are vinylbenzylamines); and 2-vinylpyridine, 4-vinylpyridine, and N-vinylimidazole. Among them, N,N-dimethylaminoethyl(meth)acrylate, N,N-diethylaminoethyl(meth)acrylate, N-tert-butylaminoethylmethacrylate, N,N-dimethylaminopropyl(meth)acrylate, 3-(N,N-diethylamino)propyl(meth)acrylamide, 3-(N,N-dimethylamino)propyl(meth)acrylamide, 2-vinylpyridine, 4-vinylpyridine, and N-vinylimidazole are preferable. In the present specification, the term "(meth)acryl" means both of "acryl" and "methacryl".

The content of the repeating unit having a basic functional group contained in the specific polymer (b) is in the range of preferably from 2 to 35% by mass, more preferably from 5 to 30% by mass, and most preferably from 5 to 25% by mass based on the specific polymer (b) from the viewpoint of the solubility of the pigment dispersant with respect to the organic solvent or the monomer, synthetic aptitude, and dispersibility.

The specific polymer (b) further may include another repeating units in addition to the repeating unit having a basic functional group, or the repeating unit represented by Formula (1). In this case, it is preferable that the specific polymer (b) is a graft copolymer having another repeating unit as a side chain. It is more preferable that the graft copolymer has, as a side chain thereof, a repeating unit derived from a polymerizable oligomer having an ethylenically-unsaturated double bond at the end of the oligomer.

The polymerizable oligomer having an ethylenically unsaturated double bond at the end thereof is a compound having a predetermined molecular weight, and thus this oligomer is also referred to as a macromonomer.

Since the repeating unit derived from the polymerizable oligomer is contained, the specific polymer (b) can disperse a pigment more stably by a high affinity of the polymerizable oligomer to a liquid medium. Accordingly, it is preferred that the polymerizable oligomer has a high affinity to the liquid medium. The affinity of the polymerizable oligomer to the liquid medium can be estimated, for example, by a solubility parameter proposed by HOY (for example, refer to "Journal of Paint Technology" (in English), 1970, vol. 42, pages 76-78).

Since it is said that the solubility of a solute to a solvent is favorable in a case where the values of solubility parameters δt of the solute and the solvent are close to each other, the solubility parameter of the polymerizable oligomer is in the range of preferably from 80% to 120%, and more preferably from 85% to 115% of the solubility parameter of the liquid medium. This preferred range of the solubility parameter for the polymerizable oligomer is also identical for the ink composition, etc. which is formed by using the pigment dispersion of the invention. In a case where the value of the solubility parameter is within the range described above, the structure of the polymerizable oligomer is not particularly limited. When the solubility parameter of the polymerizable oligomer is within the range described above, the dispersion stability of the pigment contained in the pigment dispersion becomes more excellent.

The polymerizable oligomer has a polymer chain moiety and a polymerizable functional group moiety having an ethylenically unsaturated double bond at a terminal end thereof.

It is preferred that the group having the ethylenically unsaturated double bond is present only on one terminal end of the polymer chain from a view point of obtaining a desired graft polymer. As the group having the ethylenically unsaturated double bond, a (meth)acryloyl group and a vinyl group are preferred, and a (meth)acryloyl group is particularly preferred.

The polymer chain moiety in the polymerizable oligomer is generally a homopolymer or a copolymer formed of at least one monomer selected from the group consisting of an alkyl (meth)acrylate, styrene and a derivative thereof, acrylonitrile, vinyl acetate, and butadiene; polyethylene oxide; polypropylene oxide, or polycaprolactone.

The polymerizable oligomer is preferably a polymerizable oligomer represented by the following formula (2).

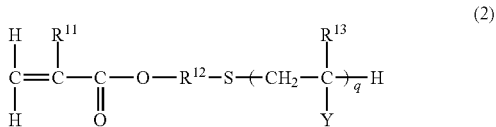

(2)

In formula (2), $R^{11}$ and $R^{13}$ each independently represent a hydrogen atom or a methyl group, $R^{12}$ represents an alkylene group having 1 to 12 carbon atoms (preferably, an alkylene group having 2 to 4 carbon atoms; the alkyl group may have a substituent (for example, a hydroxyl group) and, further, may be bonded via an ester bond, ether bond, amide bond, or the like).

Y represents a phenyl group or a phenyl group having an alkyl group having 1 to 4 carbon atoms, or $—COOR^{14}$ in which $R^{14}$ represents an alkyl group having 1 to 6 carbon atoms, a phenyl group, or an aryl alkyl group having 7 to 10 carbon atoms. Y represents preferably a phenyl group or a $—COOR^{14}$ in which $R^{14}$ is an alkyl group having 1 to 12 carbon atoms.

q represents a number of from 15 to 200, preferably from 20 to 150, and more preferably from 20 to 100.

Preferred examples of the polymerizable oligomer (macromonomer) include poly[methyl(meth)acrylate], poly[n-butyl(meth)acrylate], and poly[iso-butyl(meth)acrylate], and a polymer in which a (meth)acryloyl group is bonded to one of terminal ends of the molecule of polystyrene. The polymerizable oligomer that is commercially available includes a polystyrene oligomer methacryloylated on one terminal end (Mn=6000, trade name: AS-6, manufactured by Toagosei Co., Ltd.), a poly(methyl methacrylate) oligomer methacryloylated at one terminal end (Mn=6000, trade name: AA-6, manufactured by Toagosei Co., Ltd.), and a poly(n-butyl acrylate) oligomer methacryloylated at one terminal end (Mn=6000, trade name: AB-6, manufactured by Toagosei Co., Ltd.).

As the polymerizable oligomer, not only the polymerizable oligomer represented by formula (2) but also a polymerizable oligomer represented by the following formula (3) are preferred.

In a case of using polymerizable compounds together, it is particularly preferred to properly select the polymerizable oligomer in accordance with the polymerizable compound.

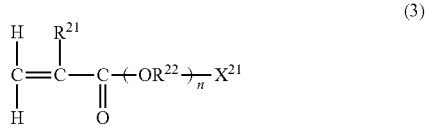

(3)

In formula (3), $R^{21}$ represents a hydrogen atom or a methyl group, and $R^{22}$ represents an alkylene group having 1 to 8 carbon atoms. $X^{21}$ represents $—OR^{23}$ or $—OCOR^{24}$. $R^{23}$ and $R^{24}$ represent a hydrogen atom, an alkyl group, or an aryl group. n represents a number of from 2 to 200.

In formula (3), $R^{21}$ represents a hydrogen atom or a methyl group.

$R^{22}$ represents an alkylene group having 1 to 8 carbon atoms and, among them, an alkylene group having 1 to 6 carbon atoms is preferred and an alkylene group having 2 to 3 carbon atoms is more preferred.

In a case where $X^{21}$ represents $—OR^{23}$, $R^{23}$ preferably represents a hydrogen atom, an alkyl group having 1 to 18 carbon atoms, a phenyl group, or a phenyl group substituted with an alkyl group having 1 to 18 carbon atoms. In a case where $X^{21}$ represents $—OCOR^{24}$, $R^{24}$ preferably represents an alkyl group having 1 to 18 carbon atoms.

n represents a number of from 2 to 200, preferably from 5 to 150, and particularly preferably from 10 to 100.

The polymerizable oligomer represented by formula (3) includes, for example, polyethylene glycol mono(meth)acrylate, polypropylene glycol mono(meth)acrylate, polyethylene glycol polypropylene glycol mono(meth)acrylate, and polytetramethylene glycol monomethacrylate, which may be commercial products or may be synthesized properly.

The polymerizable oligomer represented by formula (3) is also available as commercial products as described above. Examples of the commercial products include methoxy polyethylene glycol methacrylate (trade name; NK ESTER M-40G, M-90G. M-230G, manufactured by Shin-Nakamura Chemical Co., Ltd.), BLEMMER PME-100, PME-200, PME-400, PME-1000, PME-2000, and PME-4000 (trade name; manufactured by NOF Corporation), polyethylene glycol monomethacrylate (trade name: BLEMMER PE-90, PE-200, PE-350, manufactured by NOF Corporation), lauryloxy polyethylene glycol acrylate (trade name: BLEMMER ALE series, manufactured by NOF Corporation), polypropylene glycol monomethacrylate (trade name: BLEMMER PP-500, PP-800, PP-1000, manufactured by NOF Corporation), polyethylene glycol polypropylene glycol monomethacrylate (trade name: BLEMMER 70PEP-370B, manufactured by NOF corporation), polyethylene glycol polytetramethylene glycol monomethacrylate (trade name: BLEMMER 55-PET-800, manufactured by NOF corporation), polypropylene glycol polytetramethylene glycol monomethacrylate (trade name: BLEMMER NHK-5050, manufactured by NOF corporation).

The weight average molecular weight (Mw) in terms of polystyrene of the polymerizable oligomer is in the range of preferably from 500 to 20,000, and particularly preferably from 2,000 to 15,000.

A ratio of the repeating units derived from the polymerizable oligomer contained in the specific polymer is in the range of preferably from 40 to 96% by mass, more preferably from 50 to 90% by mass, and most preferably from 55 to 85% by mass. When the ratio of the repeating units derived from the polymerizable oligomer in the specific polymer is within the range described above, the affinity to the liquid medium becomes good and the adsorption of the specific polymer to the pigment becomes more excellent. As a result, viscosity of the pigment dispersion and that of the ink composition as an application form thereof can be suppressed effectively.

Specific examples of the polymerizable oligomer used preferably in the invention are to be shown below. However, the invention is not restricted to them. m and n represent a number of the repeating unit.

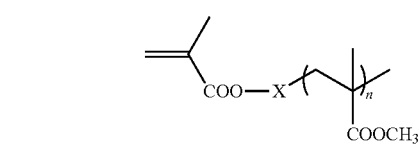

N-1

"AA-6" manufactured by Toagosei Co., Ltd. (structure described above, X: not disclosed)

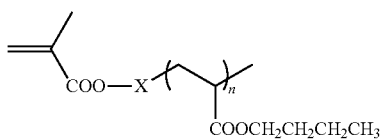

N-2

"AB-6" manufactured by Toagosei Co., Ltd. (structure described above, X: not disclosed)

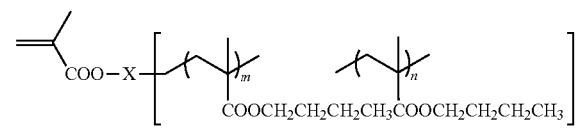

N-3

"AX-707" manufactured by Toagosei Co., Ltd. (structure described above, X: not disclosed)

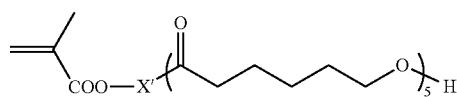

N-4

"PLACCEL FM5" manufactured by Daicel Chemical Industries, Ltd. (structure described above, X': not disclosed)

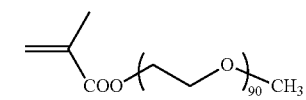

N-5

"BLEMMER PME-4000" manufactured by NOF Corporation

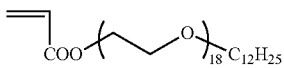

N-6

"BLEMMER ALE-800" manufactured by NOF Corporation

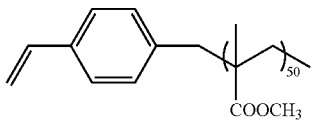

N-7

The specific polymer (b) may be a copolymer of a monomer providing a repeating unit represented by Formula (1), the polymerizable oligomer represented by Formula (2) or (3) and other copolymerizable monomer (s) that is copolymerizable with these monomers, which is also a preferred embodiment. Examples of the other copolymerizable monomer include alkyl (meth)acrylate esters (for example, methyl (meth)acrylate, ethyl(meth)acrylate, n-butyl(meth)acrylate, and i-butyl(meth)acrylate); alkylaryl(meth)acrylate ester (for example, benzyl(meth)acrylate, phenoxyethyl(meth)acrylate, substituted alkyl(meth)acrylate ester (for example, glycidyl(meth)acrylate, 2-hydroxyethyl(meth)acrylate, dimethylaminoethyl(meth)acrylate); unsaturated carboxylic acids (for example, (meth)acrylic acid, crotonic acid, itaconic acid, maleic acid, and fumaric acid); aromatic vinyl compounds (for example, styrene, α-methylstyrene, vinyl toluene, 2-vinylpyridine, 4-vinylpyridine, and N-vinylimidazole); vinyl carboxylate ester (for example, vinyl acetate and vinyl propionate); vinyl cyanate (for example, (meth)acrylonitrile and α-chloroacrylonitrile), vinyl ether (cyclohexyl vinyl ether, 4-hydroxybutylvinylether); and aliphatic conjugated diene (for example, 1,3-butadiene, and isoprene). Among them, substituted alkyl(meth)acrylate ester, alkyl (meth)acrylate ester, alkylaryl(meth)acrylate ester are preferred.

In a case in which the specific polymer (b) has a repeating unit derived from the other copolymerizable monomers, the repeating unit derived from the other copolymerizable monomers is contained in the range of 30% by mass or less based on all of the repeating units contained in the specific polymer.

A composition ratio ((E1):(E2):(E3):(E4)) of a repeating unit (E1) represented by Formula (1), a repeating unit (E2) containing a basic functional group, a repeating unit (E3) derived from a polymerizable oligomer, and a repeating unit (E4) derived from the other copolymerizable monomers in the specific polymer (b) is preferably from 5 to 30% by mass: from 2 to 35% by mass: from 40 to 93% by mass: from 0 to 30% by mass, more preferably from 5 to 25% by mass: from 5 to 30% by mass: from 45 to 90% by mass: from 0 to 25% by mass, and most preferably from 5 to 20% by mass: from 5 to 25% by mass: from 55 to 90% by mass: from 0 to 20% by mass.

A preferred weight average molecular weight (Mw) of the specific polymer (b) is in the range of from 10,000 to 500,000, and particularly from 15,000 to 200,000, from a view point of dispersion stability of the pigment and viscosity of the pigment dispersion. The weight average molecular weight (Mw) is a weight average molecular weight in term of polystyrene measured by gel permeation chromatography (carrier: N-methyl pyrrolidone).

Specific examples of the graft copolymer which is a preferred exemplary embodiment of the specific polymer (b) include the following exemplary compounds (b-1) to (b-4), however the invention is not limited thereto.

(b-1) Copolymer of MonomerM-4/N-tertbutylaminoethylmethacrylate/Polymerizable oligomer N-1 (AA-6, manufactured by Toagosei Co., Ltd.) (5:20:75, mass ratio) (Mw=17000)

(b-2) Copolymer of Monomer M-4/N-tert butylaminoethylmethacrylate/Polymerizable oligomer N-1 (AA-6, manufactured by Toagosei Co., Ltd.) (10:10:80, mass ratio) (Mw=78000)

(b-3) Copolymer of Monomer M-4/N-tertbutylaminoethylmethacrylate/Polymerizable oligomer N-1 (AA-6, manufactured by Toagosei Co., Ltd.) (30:10:60, mass ratio) (Mw=179000)

(b-4) Copolymer of MonomerM-17/N,N-dimethylaminopropylacrylamide/polymerizable oligomer N-1 (AA-6, manufactured by Toagosei Co., Ltd.) (10:10:80, mass ratio) (Mw=80000)

(b-5) Copolymer of Monomer M-10/N-tertbutylaminoethylmethacrylate/Polymerizable oligomer N-1 (AA-6, manufactured by Toagosei Co., Ltd.) (10:20:70, mass ratio) (Mw=110000)

(b-6) Copolymer of Monomer M-19/N-tertbutylaminoethylmethacrylate/Polymerizable oligomer N-1 (AA-6, manufactured by Toagosei Co., Ltd.) (5:20:75, mass ratio) (Mw=130000)

(b-5) Copolymer of Monomer M-14/N-vinylimidazole/Polymerizable oligomer N-5 (BLEMMER PME-1000, manufactured by NOF Corporation) (15:25:60, mass ratio) (Mw=100000)

(b-6) Copolymer of Monomer M-6/N,N-dimethylaminoethylmethacrylate/Polymerizable oligomer N-2 (AB-6, manufactured by Toagosei Co., Ltd.) (5:10:85, mass ratio) (Mw=130000)

(b-7) Copolymer of Monomer M-1/3-dimethylaminopropylacrylamide/Polymerizable oligomer N-1 (AA-6, manufactured by Toagosei Co., Ltd.) (8:22:70, mass ratio) (Mw=67000)

(b-8) Copolymer of Monomer M-4/4-vinylpyridine/Polymerizable oligomer N-4 (PLACCEL FM5, manufactured by Daicel Chemical Industries, Ltd.) (10:5:85, mass ratio) (Mw=70000)

(b-9) Copolymer of Monomer M-10/N,N-dimethylaminoethylacrylate/Methylacrylate/Polymerizable oligomer N-1 (AA-6, manufactured by Toagosei Co., Ltd.) (5:5:20:30, mass ratio) (Mw=89000)

(b-10) Copolymer of Monomer M-4/N,N-dimethylaminopropylacrylamide/Polymerizable oligomer N-3 (AX-707S, manufactured by Toagosei Co., Ltd.) (20:10:70, mass ratio) (Mw=91000)

(b-11) Copolymer of Monomer M-14/N-vinylimidazole/Polymerizable oligomer N-5 (BLEMMER PME-1000, manufactured by NOF Corporation) (15:25:60, mass ratio) (Mw=100000)

(b-12) Copolymer of Monomer M-6/N,N-dimethylaminoethylmethacrylate/Polymerizable oligomer N-2 (AB-6, manufactured by Toagosei Co., Ltd.) (5:10:85, mass ratio) (Mw=130000)

In the pigment dispersion of the invention, a content of the specific polymer (b) is in the range of from 10 to 30 parts by mass, preferably from 10 to 25 parts by mass, and more preferably from 10 to 20 parts by mass based on 100 parts by mass of the pigment (a) from the viewpoint of achieving a good balance between dispersion stability and fluidity.

<Specific Graft Copolymer (c)>

The pigment dispersion of the invention contains the specific graft copolymer (c). The specific graft copolymer (c) shows adsorption force due to an acid-base interaction between an amino group or an imino group in a main chain and an acid radical on the surface of the pigment (a). Further, the polyester chain introduced into the side chain of the specific graft copolymer (c) has affinity with a liquid medium in the pigment dispersion or the ink composition. Accordingly, the pigment may be well dispersed. The specific graft copolymer (c) may cause a problem such that viscosity in a high concentration region of the pigment is significantly increased with the progress of dispersion. However, when the specific graft copolymer (c) is used in combination with the specific polymer (b), the increase in viscosity with the progress of dispersion is suppressed, so that the stability of the ink composition tends to be improved when the pigment dispersion is used for the ink composition.

It is preferable that a main chain in the specific graft copolymer (c) has a primary or secondary amino group.

The main chain may have structures other than a polyester chain. Examples of the structures include a polyalkyleneoxy chain having any of a hydroxyl group, an alkyloxy group having 1 to 18 carbon atoms, an aryloxy group having 6 to 15 carbon atoms, and an alkyl-substituted aryloxy group having 7 to 15 carbon atoms at the end of a side chain of the specific graft copolymer.

The length of the side chain in the specific graft copolymer is in the range of preferably from 400 to 15000, and more preferably from 400 to 10000 from the viewpoint of generating an effective steric repulsion.

The weight average molecular weight of the specific graft copolymer (c) is in the range of preferably from 3000 to 200000, and more preferably from 5000 to 100000 from the viewpoint of achieving a good valence between dispersion stability and low viscosity.

Specific examples of the specific graft copolymer (c) are shown below. However, the invention is not limited thereto:

SOLSPERSE 24000GR, SOLSPERSE 24000SC, SOLSPERSE 28000, SOLSPERSE 32000, SOLSPERSE 33000, SOLSPERSE 33500, SOLSPERSE 37000, SOLSPERSE 39000, SOLSPERSE 56000, SOLSPERSE 71000, and SOLSPERSE 76500 (manufactured by Lubrizol Corporation); and AJISPAR PB821, AJISPAR PB822, AJISPAR PB823, AJISPAR PB824, AJISPAR PB827, AJISPAR PB880, and AJISPAR PB881 (manufactured by Ajinomoto Fine-Techno Co., Inc.)

In the pigment dispersion of the invention, a content of the specific graft copolymer (c) is in the range of from 15 to 50 parts by mass, preferably from 15 to 45 parts by mass, and more preferably from 15 to 40 parts by mass based on 100 parts by mass of the pigment (a) from the viewpoint of improving fluidity at a high pigment concentration.

In the pigment dispersed product of the invention, a total content of the specific polymer (b) and the specific graft copolymer (c) is in the range of from 25 to 70 parts by mass, preferably from 25 to 65 parts by mass, and more preferably from 25 to 60 parts by mass based on 100 parts by mass of the pigment (a) from the viewpoint of improving dispersion stability and fluidity at a high pigment concentration.

In the pigment dispersion of the invention, a value ((B)/(C)) obtained by dividing the content (B) of the specific polymer (b) by the content (C) of the specific graft copolymer (c) is in the range of preferably from 0.2 to 1.3, more preferably from 0.2 to 1.25, and further preferably from 0.2 to 1.0 from the viewpoint of fluidity.

(d) Polymerizable Compound

The pigment dispersion of the invention preferably contains a polymerizable compound. The polymerizable compound is not particularly restricted so long as it induces polymerizing reaction and causes curing by the application of any energy, and can be used irrespective of the species of the monomer, the oligomer, and the polymer. Particularly, various types of known polymerizable monomers known as radically polymerizable monomers or cationically polymerizable monomers that induce polymerizing reaction by initiation species generated from an optionally added polymerization initiator are preferred. Since a basic functional group is used in a preferable exemplary embodiment of the invention, it is preferred that a radically polymerizable monomer is contained in the pigment dispersion of the invention.

The polymerizable compound (d) may be used alone or as a mixture of plurality of them in order to control a reaction rate, property of cured film, property of ink in a case of applying the pigment dispersion to an ink composition. Further, the polymerizable compound (d) may be a mono-functional compound or a poly-functional compound. When a ratio of the mono-functional compound is high, a cured product tends to be softened and, when a ratio of the poly-functional compound is high, the curability tends to become excellent. Accordingly, the ratio of the mono-functional compound and the poly-functional compound is optionally determined depending on the use application.

As the polymerizable compound (d), various types of known radically polymerizable monomers that induce a polymerizing reaction by a starting species generated from a photo-radical initiator can be used.

The radically polymerizable monomer includes, for example, (meth)acrylates, (meth)acrylamides, and aromatic vinyl compounds. In the present specification, they are sometimes described as "(meth)acrylate" in a case of indicating one or both of "acrylate" and "methacrylate" and as "(meth) acryl" in a case of indicating one or both of "acryl" and "methacryl".

(Meth)acrylates used as the radically polymerizable monomer include, for example, mono-functional (meth)acrylate, bi-functional (meth)acrylate, tri-functional (meth)acrylate, tetra-functional (meth)acrylate, penta-functional (meth)acrylate, and hexa-functional (meth)acrylate.

The mono-functional (meth)acrylate includes, for example, hexyl (meth)acrylate, 2-ethylhexyl(meth)acrylate, tert-octyl(meth)acrylate, isoamyl(meth)acrylate, decyl (meth)acrylate, isodecyl(meth)acrylate, stearyl(meth)acrylate, isostearyl(meth)acrylate, cyclohexyl(meth)acrylate, 4-n-butylcyclohexyl(meth)acrylate, bornyl(meth)acrylate, isobornyl(meth)acrylate, benzyl(meth)acrylate, 2-echylhexyldiglycol(meth)acrylate, butoxyethyl(meth)acrylate, 2-chloroethyl(meth)acrylate, 4-bromobutyl(meth)acrylate, cyanoethyl(meth)acrylate, benzyl(meth)acrylate, butoxymethyl(meth)acrylate, 3-methoxybutyl(meth)acrylate, alkoxymethyl(meth)acrylate, alkoxyethyl(meth)acrylate, 2-(2-methoxyethoxy)ethyl(meth)acrylate, 2-(2-butoxyethoxy)ethyl(meth)acrylate, 2,2,2-tetrafluoroethyl(meth)acrylate, 1H,1H,2H,2H-perfluorodecyl(meth)acrylate, 4-butylphenyl(meth)acrylate, phenyl(meth)acrylate, 2,4,5-tetramethylphenyl(meth)acrylate, 4-chlorophenyl(meth)acrylate, phenoxymethyl(meth)acrylate, phenoxyethyl (meth)acrylate, glycidyl(meth)acrylate, glycidyloxybutyl (meth)acrylate, glycidyloxyethyl(meth)acrylate, glycidyloxypropyl(meth)acrylate, tetrahydrofurfuryl(meth) acrylate, hydroxyalkyl(meth)acrylate, 2-hydroxyethyl(meth) acrylate, 3-hydroxypropyl(meth)acrylate, 2-hydroxypropyl (meth)acrylate, 2-hydroxybutyl(meth)acrylate, 4-hydroxybutyl(meth)acrylate, 3-hydroxybutyl(meth) acrylate, dimethylaminoethyl(meth)acrylate, diethylaminoethyl(meth)acrylate, dimethylaminopropyl(meth)acrylate, diethylaminopropyl(meth)acrylate, trimethoxysilylpropyl (meth)acrylate, trimethylsilylpropyl(meth)acrylate, polyethylene oxide methyl ether(meth)acrylate, oligoethylene oxide monomethyl ether(meth)acrylate, polyethylene oxide(meth) acrylate, oligoethylene oxide(meth)acrylate, oligoethylene oxide monoalkyl ether(meth)acrylate, polyethylene oxide monoalkyl ether(meth)acrylate, dipropyleneglycol(meth) acrylate, polypropylene oxide monoalkyl ether(meth)acrylate, oligopropylene oxide monoalkyl ether(meth)acrylate, 2-methacryloyloxy ethyl succinic acid, 2-methacryloyloxy hexahydrophthalic acid, 2-methacryloyloxy ethyl-2-hydroxypropyl phthalate, butoxydiethylene glycol(meth)acrylate, trifluoroethyl(meth)acrylate, perfluorooctylethyl(meth)acrylate, 2-hydroxy-3-phenoxypropyl(meth)acrylate, EO modified phenol(meth)acrylate, EO modified cresol(meth)acrylate, EO modified nonylphenol(meth)acrylate, PO modified nonylphenol(meth)acrylate, EO modified-2-ethylhexyl (meth)acrylate, dicyclopentenyl(meth)acrylate, dicyclopentenyloxyethyl(meth)acrylate, dicyclopentanyl(meth)acrylate, (3-ethyl-3-oxetanylmethyl)(meth)acrylate, and phenoxyethyleneglycol(meth)acrylate.

Bi-functional (meth)acrylate includes, for example, 1,6-hexanediol di(meth)acrylate, 1,10-decanediol di(meth)acrylate, neopentylglycol di(meth)acrylate, 2,4-dimethyl-1,5-pentanediol di(meth)acrylate, butylethylpropanediol(meth) acrylate, ethoxylated cyclohexane methanol di(meth) acrylate, polyethylene glycol di(meth)acrylate, oligoethylene glycol di(meth)acrylate, ethylene glycol di(meth)acrylate, 2-ethyl-2-butyl-butanediol di(meth)acrylate, neopentylglycol hydroxypivalate di(meth)acrylate, EO modified bisphenol A di(meth)acrylate, bisphenol F polyethoxy di(meth) acrylate, polypropylene glycol di(meth)acrylate, oligopropylene glycol di(meth)acrylate, 1,4-butanediol di(meth)acrylate, 2-ethyl-2-butylpropanediol di(meth)acrylate, 1,9-nonane di(meth)acrylate, propoxylated ethoxylated bisphenol A di(meth)acrylate, tricyclodecane di(meth)acrylate, dipropylene glycol di(meth)acrylate, and propoxylated neopentylglycol di(meth)acrylate.

The tri-functional (meth)acrylate includes, for example, trimethylolpropane tri(meth)acrylate, tirimethylolethane tri (meth)acrylate, alkylene oxide modified tri(meth)acrylate of trimethylolpropane, pentaerythritol tri(meth)acrylate, dipentaerythritol tri(meth)acrylate, trimethylolpropane tri((meth) acryloyloxypropyl) ether, isocyanuric acid alkylene oxide modified tri(meth)acrylate, propionic acid dipentaerythritol tri(meth)acrylate, tri((meth)acryloyloxyethyl) isocyanurate, hydroxyl pivalaldehyde modified dimethylol propane tri (meth) acrylate, sorbitol tri(meth)acrylate, propoxylated trimethylolpropane tri(meth)acrylate, and ethoxylated glycerin tri(meth)acrylate.

The tetra-functional (meth)acrylate includes, for example, pentaerythritol tetra(meth)acrylate, sorbitol tetra(meth)acrylate, ditrimethylolpropane tetra(meth)acrylate, dipentaerythritol propionate tetra(meth)acrylate, and ethoxylated pentaerythritol tetra(meth)acrylate.

The penta-functional (meth)acrylate includes, for example, sorbitol penta(meth)acrylate, and dipentaerythritol penta(meth)acrylate.

The hexa-functional (meth)acrylate includes, for example, dipentaerythritol hexa(meth)acrylate, sorbitol hexa(meth) acrylate, alkylene oxide modified hexa(meth)acrylate of phosphazene, and ε-caprolactone modified dipentaerythritol hexa(meth)acrylate.

The (meth)acrylamides used as the radically polymerizable monomer include, for example, (meth)acrylamide, N-methyl(meth)acrylamide, N-ethyl(meth)acrylamide, N-propyl(meth)acrylamide, N-n-butyl(meth)acrylamide, N-t-butyl(meth)acrylamide, N-butoxymethyl(meth)acrylamide, N-isopropyl(meth)acrylamide, N-methylol(meth) acrylamide, N,N-dimethyl(meth)acrylamide, N,N-diethyl (meth)acrylamide, and (meth)acryloyl morpholine.

The aromatic vinyl compounds used as the radically polymerizable monomer include, for example, styrene, methylstyrene, dimethylstyrene, trimethylstyrene, ethylstyrene, isopropylstyrene, chloromethylstyrene, methoxystyrene, acetoxystyrene, chlorostyrene, dichlorostyrene, bromostyrene, methyl vinyl benzoate ester, 3-methylstyrene, 4-methylstyrene, 3-ethylstyrene, 4-ethylstyrene, 3-propylstyrene, 4-propylstyrene, 3-butylstyrene, 4-butylstyrene, 3-hexylstyrene, 4-hexylstyrene, 3-octylstyrene, 4-octylstyrene, 3-(2-ethylhexyl)styrene, 4-(2-ethylhexyl)styrene, allylstyrene, isopropenylstyrene, butenylstyrene, octenylstyrene, 4-t-butoxycarbonyl styrene, 4-methoxystyrene, and 4-t-butoxystyrene.

Further, the radically polymerizable monomer applicable in the invention includes, for example, vinyl esters (vinyl acetate, vinyl propionate, vinyl versatate, etc.), allyl esters (allyl acetate, etc.), halogen-containing monomers (vinylidene chloride, vinyl chloride, etc.), vinyl ethers (methyl vinyl ether, butyl vinyl ether, hexyl vinyl ether, methoxy vinyl ether, 2-ethylhexyl vinyl ether, methoxyethyl vinyl ether, cyclohexyl vinyl ether, chloroethyl vinyl ether, triethylene glycol divinyl ether, etc.), vinyl cyanate ((meth)acrylonitrile, etc,) and olefins (ethylene, propylene, etc.).

Among them, as the radically polymerizable monomer applicable in the invention, (meth)acrylates, and (meth)acrylamides are preferred from a view point of curing rate. From a view point of curing rate and viscosity of the pigment dispersion, it is preferred to use the above-described polyfunctional (meth)acrylate and the above-described monofunctional or bi-functional (meth)acrylate and/or (meth)acrylamide together.

When the pigment dispersion of the invention contains the polymerizable compound (d), the content of the polymerizable compound (d) is in the range of preferably from 50 to 95% by mass, and more preferably from 60 to 90% by mass based on a total mass of the pigment dispersed product from the viewpoint of curability.

Organic Solvent (e)

The pigment dispersion and the ink composition of the invention may contain the organic solvent (e) together with or in place of the polymerizable compound (d). The organic solvent to be used may be appropriately selected depending on their purposes. For example, known alcohol solvents, ester solvents, ether solvents, hydrocarbon solvents, or ketone solvents are preferably used. Specifically, alkylene oxide monoalkyl ether, alkylene oxide monoalkyl ether acetate, alkylene glycol diacetate, dialkylester dicarboxylate, cyclohexanone, and ethyl lactate are preferred.

Dispersion Medium

In the pigment dispersion of the invention, the dispersion medium which is used in dispersing components such as pigments may be appropriately selected depending on their purposes. For example, a solvent may be used as a dispersion medium. Alternatively, a polymerizable compound with a low viscosity in the absence of solvent may be used as a dispersion medium. In a case in which a solvent is used as a dispersion medium, the above-described organic solvents may be preferably used. In a case in which the pigment dispersion is applied to a colored curable composition such as an active energy ray curable ink composition, it is preferable not to contain a volatile solvent. It is preferable to use a high-boiling-point solvent having a boiling point of 180° C. or more or it is preferable not to use any solvent. In such a case, it is also preferable to use the polymerizable compound as a dispersion medium.

Ink Composition

The ink composition of the invention contains the pigment dispersion of the invention and it is preferable that the ink composition contains at least the pigment dispersion and the polymerization initiator (f) described below and a concentration of the pigment is in the range of from 2 to 10% by mass based on the ink composition. To contain at least one of the polymerizable compound (d) or the organic solvent (e) is one of the preferred application embodiments. The ink composition is an ink composition which may be cured by irradiation with an active energy ray or heating.

The ink composition of the invention may be produced by, for example, preparing the pigment dispersion of the invention containing the pigment (a), the specific polymer (b), and the specific graft copolymer (c), and further at least one of the polymerizable compound (d) or the organic solvent (e), and further adding at least the polymerization initiator (f) to the prepared pigment dispersion.

In a case in which the ink composition of the invention is used as a curable ink composition, it is preferable that from the viewpoint of coloring properties and viscosity, a content of the pigment (a) in the ink composition is in the range of from 2 to 20% by mass (more preferably from 2 to 10% by mass) and a content of at least one of the polymerizable compound (d) or the organic solvent (e) in the ink composition is in the range of from 50 to 95% by mass (more preferably from 60 to 90% by mass (when both the polymerizable compound (d) and the organic solvent (e) are contained, the range represents a total amount, and when one of the polymerizable compound (d) and the organic solvent (e) is contained, the range represents an amount of one of them)).

In a case in which the ink composition of the invention is used as a solvent-containing ink composition, it is preferable that a content of the pigment (a) in the ink composition is in the range of from 2 to 20% by mass (more preferably from 2 to 10% by mass) and a content of the organic solvent (e) in the ink composition is in the range of from 50 to 95% by mass (more preferably from 60 to 90% by mass) from the viewpoint of viscosity and coloring properties.

It is preferable that the ink composition of the invention is prepared using the pigment dispersion which contains a polymerizable compound among the pigment dispersed products of the invention. The details of types and preferred embodiments of each component which can be contained in the pigment dispersion (the pigment (a), the specific polymer (b), the specific graft copolymer (c), the polymerizable compound (d), the organic solvent (e) or the like) have been described in the description of the pigment dispersion.

Polymerization Initiator (f)

The ink composition of the invention is preferably prepared by adding a polymerization initiator to a pigment dispersion from a view point of curing sensitivity.

The polymerization initiator used for the ink composition of the invention may be either a heat polymerization initiator or a photopolymerization initiator. When the heat polymerization initiator is contained, the ink composition shows good curability by heating. Further, when the photopolymerization initiator is contained, the ink composition is cured by the irradiation of actinic energy rays. In a case of forming images by using the ink composition of the invention, it is preferred to cure the ink composition instantaneously for obtaining sharp images. Accordingly, it is preferred to use the photopolymerization initiator as the polymerization initiator in the ink composition of the invention. Further, since the ink composition of the invention has a good dispersion stability of the pigment, it is one of the features thereof that the storage stability under the presence of the photopolymerization initiator is good.

Here, the actinic energy rays have no particular restriction so long as they can provide an energy capable of generating starting species by the irradiation in the ink composition and include, for example, $\alpha$-rays, $\gamma$-rays, X-rays, UV-rays, visible lights, and electron beams. Among them, from a view point of curing sensitivity and easy availability of apparatus, UV-rays or electron beams are preferred, and UV-rays are more preferred. Accordingly, as the ink composition of the invention, those which can be cured by irradiation of UV-rays as the irradiation rays are preferred. As a light source for generating UV-rays, those having an emission wavelength at the wavelength of from 300 nm to 400 nm are preferred, and low pressure mercury lamps, and high pressure mercury lamps, short arc discharge lamps which are known as UV-ray lamps;

UV-ray emission diodes; semiconductor lasers, and fluorescent lamps, etc. can be used. High pressure mercury lamps and metal halide lamps belonging to the high pressure discharge lamps and xenon lamps belonging to the short arc discharge lamps are used preferably depending on the amount of light and the wavelength suitable to the initiator. Further, UV-ray emission diodes are also used preferably from a view point of energy saving.

The ink composition of the invention preferably contains a polymerization initiator for radical polymerization, and more preferably contains a photopolymerization initiator.

Photopolymerization Initiator

The photopolymerization initiator is a compound causing chemical changes by the effect of light, or by way of interaction with an electron excited state of a sensitizing dye and forming at least one of radicals, acid, or basis.

A photopolymerization initiator having a sensitivity to irradiated actinic ray, for example, UV-ray at the wavelength of from 200 nm to 400 nm, FUV-ray, g-line, h-line, i-line, KrF excimer laser light, ArF excimer laser light, electron beam, X-ray, molecular beam or ion beam can be selected and used optionally.

As the photopolymerization initiator, those known to a person skilled in the art can be used with no restriction and, for example, a number of initiators described in Chemical Revue, 93, 435 (1993), written by Bruce M. Monroe, et al, in Journal of Photochemistry and Biology A: Chemistry 73, 81 (1993), written by R. S. Davidson, in "Photoinitiated Polymerization-Theory and Applications": Rapra Review vol. 9, Report, Rapra Technology (1998), by J. P. Faussier; and in Prog, Polym. Sci., 21, 1 (1996), written by M. Tsunooka, et al. can be used. Further, compounds utilized for chemical amplification type photoresist or photocationic polymerization described in "Imaging Organic Material" (in English), edited by Organic Electronics Material Kenkyukai, from Bunshin Shuppan (1993) (refer to pages 187 to 192) can be used. Further, there are known compounds causing oxidative or reducing cleave of bonding by way of interaction with the electron excited state of a sensitizing dye as described, for example, in Topics in Current Chemistry, 156, 59 (1990), by F. D. Saeva, in Topics in Current Chemistry, 168, 1 (1993), by G. G. Maslak; in JACS, 112, 6329 (1999), by H. B. Shuster, et al; and in JACS, 102, 3298 (1980) by I. D. F. Eaton et al.

As the photopolymerization initiator, (i) aromatic ketones, (ii) aromatic onium salt compounds, (iii) organic peroxides, (iv) hexaryl biimidazole compounds, (v) ketoxime ester compounds, (vi) borate compounds, (vii) azinium compounds, (viii) metallocene compounds, (ix) active ester compounds, (x) compounds having carbon-halogen bonds are preferred.

Examples thereof may include photopolymerization initiators described in paragraphs 0147 to 0225 of the specification of JP-A No. 2010-13630. Among them, the aromatic ketones (i) are preferable from the viewpoint of stability, cure sensitivity, and availability. Of the aromatic ketones (i), a benzophenone compound, an α-aminoacetophenone compound, an acyl phosphine oxide compound, and an α-hydroxy acetophenone compound are preferable. Examples of commercially available compounds include the following compounds and these may be preferably used.

Examples of the benzophenone compound include benzophenone, Michler's ketone, ESACURE TZT (manufactured by Fratelli Lamberti), and KAYACURE BMS (manufactured by Nippon Kayaku Co., Ltd.).

Examples of the α-aminoacetophenone compound include IRGACURE 369, IRGACURE 379, and IRGACURE 907 (manufactured by Ciba Specialty Chemicals Ltd).

Examples of the acyl phosphine oxide compound include IRGACURE 819 and DAROCURE TPO (manufactured by Ciba Specialty Chemicals Ltd); LUCIRIN TPO and LUCIRIN TPO-L (manufactured by BASF Co.); and bis(2,6-dimethoxybenzoyl)-2,4,4-trimethyl-pentylphenylphosphine oxide.

Examples of the α-hydroxy acetophenone compound include IRGACURE 184, IRGACURE 127, and IRGACURE 2959 (manufactured by Ciba Specialty Chemicals Ltd); and DARUCUR 1173, DAROCURE 1116, and DAROCURE 953 (manufactured by BASF Co.).

The photopolymerization initiator as a polymerization initiator may be used alone or in combination with two or more thereof. A content of the photopolymerization initiator in the ink composition is in the range of preferably from 0.1 to 20% by mass, more preferably from 0.5 to 15% by mass, and still more preferably from 1 to 10% by mass.

Sensitizing Dye

In the ink composition of the invention, a sensitizing dye may be added with an aim of improving the sensitivity of the photopolymerization initiator. As the sensitizing dye, those belonging to the following compounds and having an absorption maximum wavelength in the range of from 350 nm to 450 nm are preferred.

The sensitizing dye includes, for example, polynuclear aromatics (for example, pyrene, perylene, triphenylene, and anthracene), xanthenes (for example, fluorescein, eosin, erythrocine, rhodamine B, and rose Bengal), cyanines (for example thiacarbocyanine, and oxacarbocyanine), merocyanine (for example, merocyanine and carbomerocyanine), thiazines (for example, thionine, methylene blue, and toluidine blue), acridines (for example, acridine orange, chloroflavine, acriflavine), anthraquinones (for example, anthraquinone), squaliums (for example, squalium), and coumarines (for example, 7-diethylamino-4-methyl coumarine).

Further, as the sensitizing dye compounds represented by the following formulae (IX) to (XIII) are more preferred.

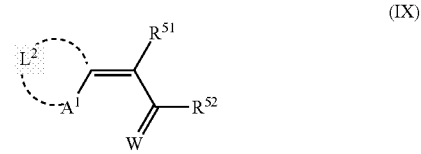

(IX)

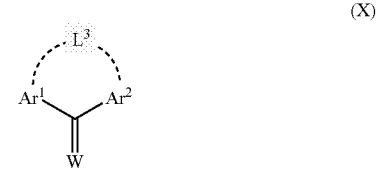

(X)

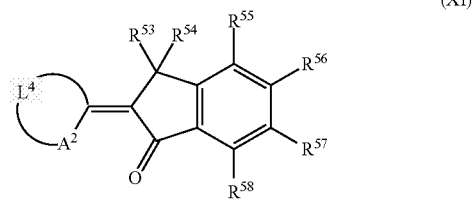

(XI)

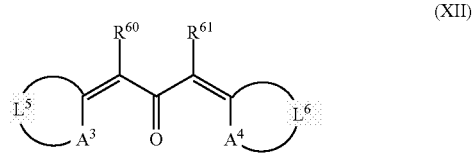

(XII)

-continued

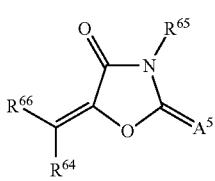

(XIII)

In Formula (IX), $A^1$ represents a sulfur atom or —$NR^{50}$—, in which $R^{50}$ represents an alkyl group or an aryl group, $L^2$ represents a non-metal atom group that forms a basic nuclei of a dye together with adjacent $A^2$ and adjacent carbon atoms, $R^{51}$ and $R^{52}$ each independently represent a hydrogen atom or a monovalent non-metal atom group, and $R^{51}$ and $R^{52}$ may be bonded to each other to form an acidic nuclei of a dye. W represents an oxygen atom or a sulfur atom.

In Formula (X), $Ar^1$ and $Ar^2$ each independently represent an aryl group and are connected through a bond of $-L^3-$. In this case, $L^3$ represents —O— or —S—. Further, W has the same meanings as those shown for formula (IX).

In formula (XI), $A^2$ represents a sulfur atom or $NR^{59}$, $L^4$ represents a non-metal atom group forming a basic nuclei of a dye together with adjacent $A^2$ and carbon atoms, $R^{53}$, $R^{54}$, $R^{55}$, $R^{56}$, $R^{57}$, and $R^{58}$ each independently represent a monovalent non-metal atom group, and $R^{59}$ represents an alkyl group or an aryl group.

In formula (XII), $A^3$ and $A^4$ each independently represent —S— or —$NR^{62}$— or —$NR^{63}$—, $R^{62}$ and $R^{63}$ each independently represent a substituted or unsubstituted alkyl group, or a substituted or not-substituted aryl group, $L^5$ and $L^6$ each independently represent a non-metal atom group forming a basic nuclei of a dye together with adjacent $A^3$ and $A^4$ and adjacent carbon atoms, and $R^{60}$ and $R^{61}$ each independently represent a hydrogen atom or a monovalent non-metal atom group or can be bonded to each other to form an aliphatic or aromatic ring.

In formula (XIII), $R^{66}$ represents an aromatic ring or heterocyclic ring which may have a substituent, $A^5$ represents an oxygen atom, a sulfur atom, or —$NR^{67}$—. $R^{64}$, $R^{65}$, and $R^{67}$ each independently represent a hydrogen atom or a monovalent non-metal atom group, and $R^{67}$ and $R^{64}$, and $R^{65}$ and $R^{67}$ can be bonded to each other to form an aliphatic or aromatic ring.

Preferred specific examples of the compound represented by formulae (IX) to (XIII) include those exemplified compounds (A-1) to (A-24) shown below.

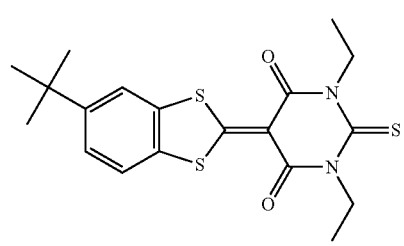

(A-1)

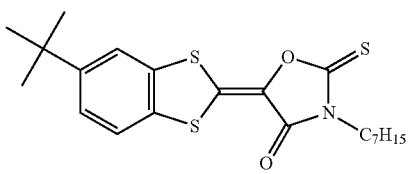

(A-2)

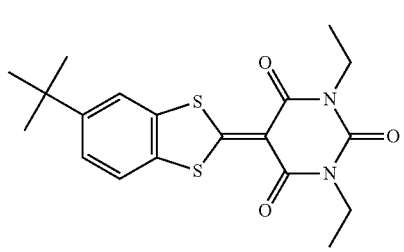

(A-3)

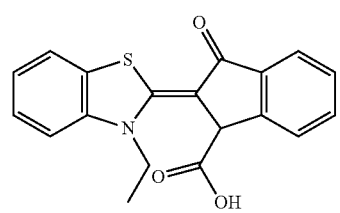

(A-4)

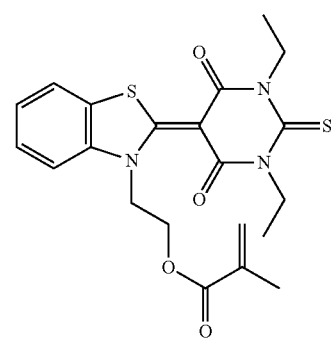

(A-5)

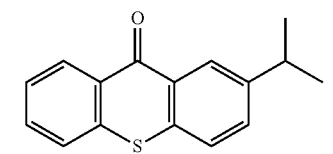

(A-6)

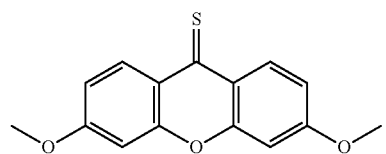

(A-7)

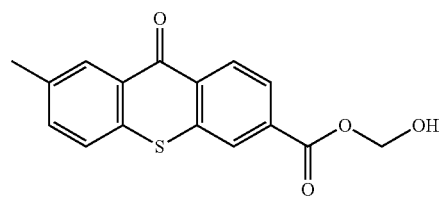

(A-8)

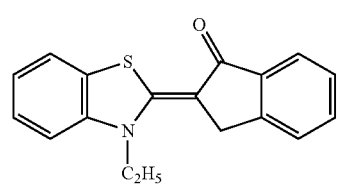

(A-9)

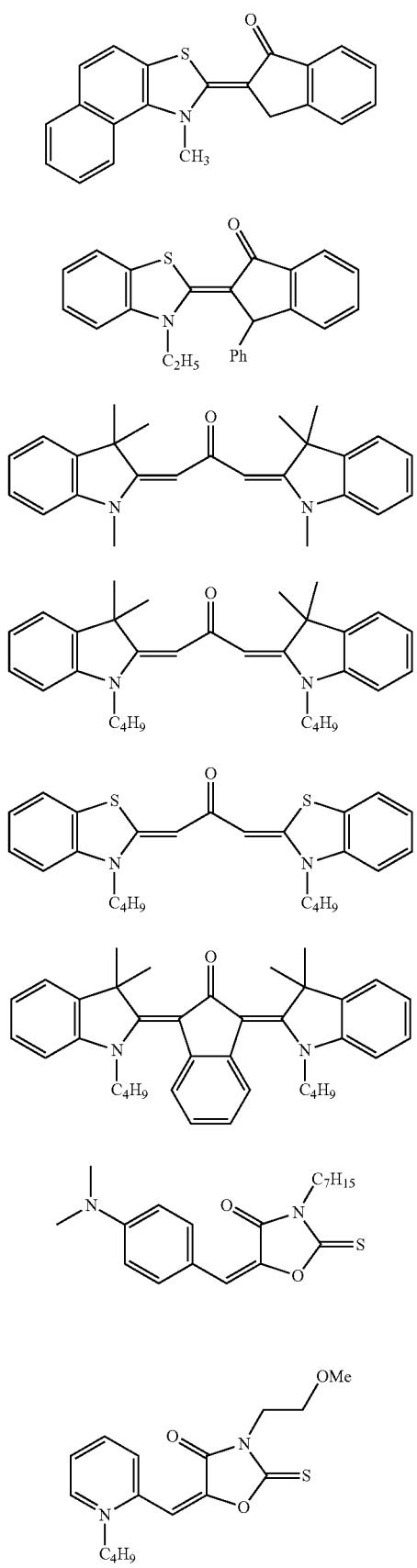
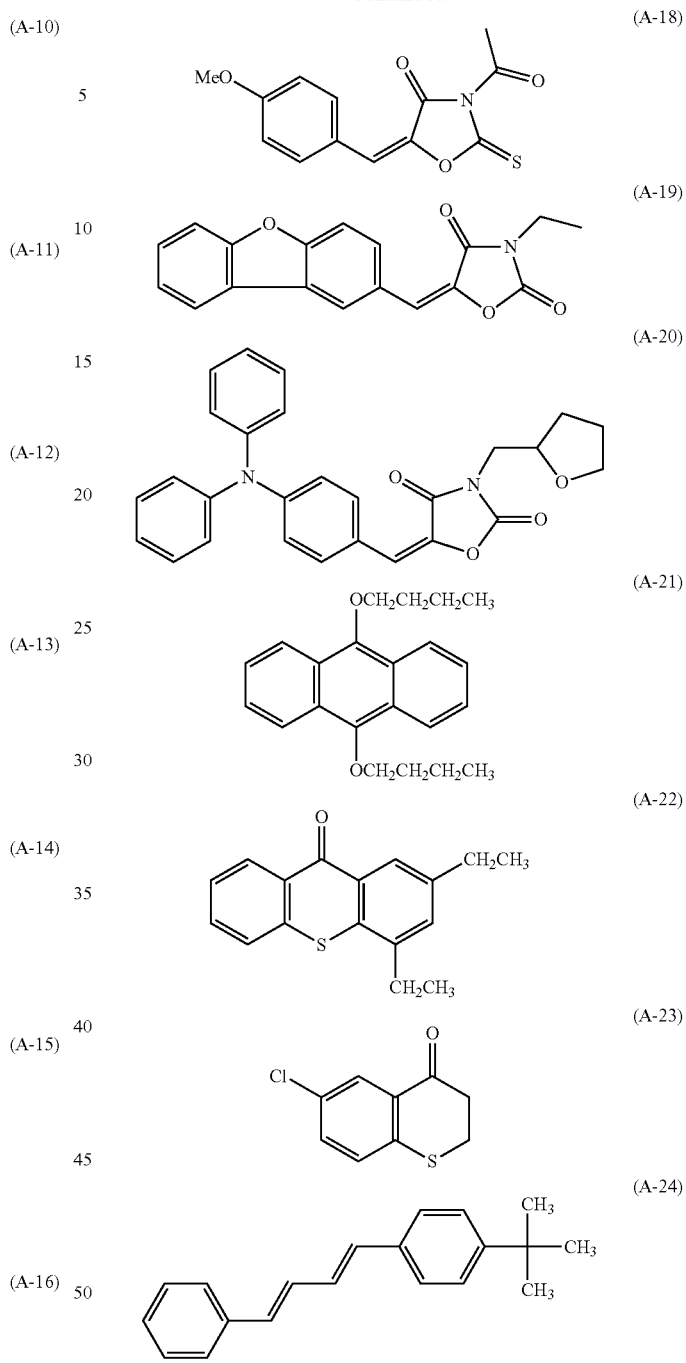

Cosensitizer

Further, a known compound having an effect of further improving the curing sensitivity of the ink composition of the invention, or suppressing inhibition of polymerization by oxygen may be added as a cosensitizer.

The cosensitizer includes amines, for example, compounds described, for example, in "Journal of Polymer Society", vol. 10, p 3173 (1972) written by M. R. Sander, et al., JP-B No. 44-20189, JP-A Nos. 51-82102, 52-134692, 59-138205, 60-84305, 62-18537, 64-33104, and Research Disclosure No. 33825. More specifically, they include triethanolamine, ethyl p-dimethylaminobenzoate ester, p-formyldimethyl aniline, and p-methylthiodimethyl aniline.

Other cosensitizers include thiol and sulfides, for example, thiol compounds described in JP-A No. 53-702, JP-B No. 55-500806, and JP-A No. 5-142772, and disulfide compounds described in JP-A No. 56-75643 and, more specifically, 2-mercaptobenzo thiazole, 2-mercaptobenzoxazole, 2-mercaptobenzoimidazole, 2-mercapto-4(3H)-quinazoline, and β-mercaptonaphthalene.

Further, other cosensitizers include, for example, aminoacid compounds (for example, N-phenylglycine), organic metal compounds described in JP-B No. 48-42965 (for example, tributyl tin acetate), hydrogen donators described in JP-B No. 55-34414, sulfur compounds described in JP-A No. 6-308727 (for example, trithian), phosphorus compounds described in JP-A No. 6-250387 (diethyl phosphite, etc.), Si—H, Ge—H compounds, etc. described in JP-A No. 6-191605.

In the ink composition of the invention, various additives can be used together depending on its purpose in addition to the pigment, the specific dispersing agent, the polymerizable compound, and the polymerization initiator, and further the sensitizing dye and the cosensitizer used in combination therewith. For example, from a view point of improving the weather proofness and anti-discoloration of obtained images, a UV absorbent can be used. Further, for improving the stability of the ink composition, an antioxidant can be added. Additives usable in the ink composition of the invention are described below.

For the ink composition of the invention, various organic type and metal complex type discoloration inhibitors, conductive salts such as potassium thiocyanate, lithium nitrate, ammonium thiocyanate, and dimethylamine hydrochloride can be added with an aim of controlling the injection property, and an extremely small amount of an organic solvent for improving the adhesion with the recording medium.

For the ink composition of the invention, various types of polymer compounds can be added with an aim of controlling the film property. As the polymer compound, acrylic polymer, polyvinylbutyral resin, polyurethane resin, polyamide resin, polyester resin, epoxy resin, phenol resin, polycarbonate resin, polyvinyl butyral resin, polyvinyl formal resin, shellac, vinyl resin, acrylic resin, rubber resin, waxes and other natural resins can be used. Further, two or more of them may be used in combination.

For the ink composition of the invention, nonionic surfactant, cationic surfactant, organic fluoro compound, etc. can also be added for controlling the liquid property.

Further, in addition, a leveling additive, a matting agent, waxes for controlling the film property may be used. Further, a tackifier that does not inhibit polymerization, for improving adhesion to a recording medium such as polyolefin or PET may be used.

Ink Composition for Inkjet

One of preferred embodiments of the ink composition of the invention is an ink composition used for inkjet. The ink composition used for inkjet of the invention can be prepared as an actinic energy ray curable type ink composition. In this case, radiation rays are irradiated for curing after application of the ink composition on a recording medium. When the solvent remains in the cured ink images, the remaining solvent may cause deterioration of resistance to the solvent, lowering of blocking property, curing failure, and aging change of physical property of ink images caused by the remaining solvent. In view of the above, it is preferred to select a polymerizable compound of low viscosity as a solvent or a polymerizable compound that is used for a dispersion medium from a view point of dispersion adaptability, improvement in handlability of the ink composition, and dis- chargeability of jetted ink. The ink composition using the above-described pigment dispersion is cured at high sensitivity by the actinic radiation rays, and there is no need to worry about increase in viscosity and lowering of the coloring property resulting from the deterioration of dispersion stability of the pigment. Accordingly, the ink composition can be favorably used for an inkjet ink that is used in the inkjet recording method in which a good viscosity stability is required as described below.

In a case of using the ink composition of the invention in an inkjet recording method, ink viscosity is preferably 30 mPa·s or less at the temperature of injection, and more preferably 20 mPa·s or less at the temperature of injection from the viewpoint of dischargeability. Accordingly, the compositional ratio is preferably controlled and decided so that the viscosity becomes within the range described above.

In addition, the ink viscosity at 25° C. (room temperature) is in the range of from 0.5 mPa·s to 200 mPa·s, preferably from 1 mPa·s to 100 mPa·s, and more preferably from 2 mPa·s to 50 mPa·s. When the viscosity at the room temperature is set high, even in a case of using a porous recording medium, penetration of the ink into the recording medium can be prevented, which results in reduction of uncured monomers as well as odor and, further, dot bleeding at the time of spotting ink droplets can be suppressed and, as a result, image quality can be improved. When the ink viscosity at 25° C. is higher than 200 mPa·s, this causes a problem in delivery of the ink liquid.

The surface tension of the ink composition of the invention when used for inkjet is in the range of preferably from 20 mN/m to 40 mN/m, and more preferably from 23 mN/m to 35 mN/m. In a case of recording to various recording media such as polyolefin, PET, coat paper or non-coat paper, it is preferably 20 mN/m or more from the viewpoint of bleeding and penetration, and preferably 35 mN/m or less from the viewpoint of wettability.

The ink composition prepared as described above is favorably used as an ink for inkjet recording. Recording is performed by printing the ink composition on a recording medium by an inkjet printer and then irradiating radiation rays to the printed ink composition thereby curing the same.

In the Printed material obtained by the ink, since the image portion is cured by the irradiation of radiation rays such as UV-rays and is excellent in the strength, it can be used for various applications, for example, formation of an ink receiving layer (image portion) of a planographic printing plate, in addition to the image formation by the ink.

Then, an inkjet recording method and an inkjet recording apparatus, that can be used in a case of applying the ink composition of the invention to the ink composition for inkjet, are described below.

Inkjet Recording Method

In the recording method by the inkjet printer, it is preferred to inject the ink composition after controlling it to a temperature range of from 25° C. to 80° C. thereby setting the viscosity of the ink composition to 30 mPa·s or lower, and high injection stability can be attained by using the method.

Generally, in a water-insoluble ink composition, since the viscosity is generally higher than that of an aqueous ink, the range of viscosity fluctuation due to the fluctuation of temperature during printing is large. Since the fluctuation of the viscosity of the ink composition directly and significantly affects the droplet size and the droplet injection speed, thereby bringing about a degradation of image quality, it is necessary that the temperature of the ink composition during printing is kept constant as much as possible. A control range for the temperature of the ink composition is preferably a set temperature±5° C., more preferably a set temperature±2° C., and still more preferably a set temperature±1° C.

One of the features of the inkjet recording apparatus used for the inkjet recording method is the provision of a stabilizing unit for stabilizing a temperature of the ink composition, and therefore all of pipeline systems and involved components ranging from an ink tank (an intermediate tank if it is provided) to a nozzle injection surface are considered as targets to be controlled to a predetermined temperature.

While a method of controlling the temperature control is not particularly restricted, it is preferred to provide, for example, a plurality of temperature sensors to each of pipeline portions thereby controlling heating in accordance with a flow rate of the ink composition and the environmental temperature. Further, a head unit to be heated is preferably shield thermally or heat-insulated such that the apparatus main body is not affected by a temperature of ambient air. In order to shorten a rising time of the printer that is required for heating, or in order to reduce a loss of heat energy, it is preferred to thermally insulate the heating unit from other portions and to reduce an entire heat capacity of the unit.

A photopolymerization initiator is added to the ink composition of the invention, thereby forming an actinic-radiation-ray-curable ink composition.

Conditions for irradiating the actinic radiation rays in the ink composition are described below. A basic irradiation method is disclosed in JP-A No. 60-132767. Specifically, light sources are disposed on both sides of the head unit, and the head and the light source are scanned by a shuttle system. Irradiation is performed at a predetermined time after spotting ink. Further, curing is completed by a separate light source with no driving. As an irradiation method, WO99/54415 discloses a method of using an optical fiber or a method of irradiating a UV light to a recording portion by hitting a collimated light source to a mirror surface disposed on the lateral side of the head unit. In the invention, any of these irradiation methods described above can be used.

Further, in a case of using the ink composition of the invention, it is preferred to heat the ink composition to a preset temperature and to set the time from impact of the ink droplets to irradiation within the period of from 0.01 to 0.5 sec, and radiation rays are irradiated preferably in the period of from 0.01 to 0.3 sec., and more preferably in the period of from 0.01 to 0.15 sec. To control the period ranging from impact of the ink droplets to irradiation to an extremely short time as described above enables to prevent the impacted ink droplet from bleeding before curing.

Further, since even a porous recording medium can be also exposed before the ink composition penetrates up to a depth of the porous medium to which exposure light can not reach, residue of unreacted monomer can be suppressed and, as a result, odors can be decreased.

By using the inkjet recording method and the ink composition of the invention in combination, a great synergistic effect is achieved. Particularly, a significant effect can be obtained by using an ink composition having an ink viscosity of 200 mPa·s or less at 25° C.

By adopting the inkjet recording method described above, the dot diameter of the impacted ink can be kept constant for various recording media of different wettability at the surface thereof, and resultantly the image quality is improved. For obtaining color images, it is preferred to overlay an ink on another ink in order of brightness from lowest to highest. When inks of lower brightness are overlaid on ink of higher brightness, radiation rays less reach the lower portion, which tends to cause inhibition of curing sensitivity, increase of a residual monomer, generation of odors and deteriorate of adhesion. Further, upon irradiation, while it is possible to conduct exposure collectively after injecting inks of full colors, exposure to each one color is preferred from a viewpoint of promoting curing.

The inkjet recording apparatus used in the invention has no particular restriction and commercial inkjet recording apparatus can be used. That is, in the invention, recording can be performed to a recording medium (printed material) by using a commercial inkjet recording apparatus.

According to the preferred injection conditions described above, while the ink composition of the invention is subjected to repetitive temperature rising and temperature falling, the ink composition of the invention has advantages capable of suppressing the lowering of the pigment dispersibility, obtaining an excellent color forming property over a long time, and also suppressing the lowering of the dischargeability caused by aggregation of the pigment, even in a case of storage under such temperature conditions.

Recording Medium

A recording medium to which the ink composition of the invention is applicable has no particular restriction and includes paper such as usual non-coat paper or coat paper, various non-absorptive resin materials used for so-called soft package, or a resin film formed by molding the material into a film shape. Various kinds of plastic films include, for example, a PET film, an OPS film, an OPP film, a ONy film, a PVC film, a PE film, and a TAC film. In addition, plastics usable as the recording material include, for example, polycarbonate, acryl resin, ABS, polyacetal, PVA and rubbers. Further, metals and glass materials can also be used as a recording medium.

Printed Material

A printed material can be obtained preferably by printing the ink composition of the invention to a recording medium by an inkjet printer and then curing the same by irradiating an actinic energy or applying heating to the printed ink composition. In the printed material prepared from the ink composition of the invention, since the ink used for forming images contains fine pigment particles uniformly and in a stably dispersed state, the printed material has high-quality images excellent in the color forming property and the sharpness and further has excellent weather proofness of the images. Accordingly, the printed material can be applied over an extensive region.

EXAMPLES

The present invention is described more specifically by way of examples, but the invention is not restricted to the embodiment of the examples.

Synthesis of Monomer Which Forms a Repeating Unit Represented by Formula (1)

Synthesis of Exemplified Monomer M-4

15 g of 9(10H)acridone (manufactured by Wako Pure Chemical Industries Ltd.) and 3.4 g of sodium hydroxide (manufactured by Wako Pure Chemical Industries Ltd.) were dissolved in 84 g of dimethyl sulfoxide (manufactured by Wako Pure Chemical Industries Ltd.) and heated to 45° C. 17.6 g of CMS-P (chloromethyl styrene, manufactured by Seimi Chemical Co.) was dropped thereto and further stirred under heating at 50° C. for 5 hours. The reaction solution was poured while stirring to a mixed solution containing 30 g of distilled water and 30 g of methanol (manufactured by Wako Pure Chemical Industries Ltd.), obtained precipitates were separated by filtration and washed with 300 g of a solution formed by mixing distilled water and methanol each by an identical mass to obtain 17.5 g of Monomer M-4.

Synthesis of Exemplified Monomer M-17

355.0 g of 1,8-naphthalimide (manufactured by Kanto Chemical Co., Inc.) was dissolved in 1500 mL of N-methylpyrrolidone (manufactured by Wako Pure Chemical Industries Ltd.), and 0.57 g of nitrobenzene (manufactured by Wako Pure Chemical Industries Ltd.) was added at 25° C., to which 301.4 g of DBU (diazabicycloundecene) (manufactured by Wako Pure Chemical Industries Ltd.) was dropped. After stirring for 30 min., 412.1 g of CMS-P was dropped and further stirred under heating at 60° C. for 4 hours. 2.7 L of isopropanol (manufactured by Wako Pure Chemical Industries Ltd.) and 0.9 L of distilled water were added to the reaction solution, and stirred while cooling to 5° C. The obtained precipitates were separated by filtration and washed with 1.2 L of isopropanol to obtain 544.0 g of Monomer M-17.

Synthesis of Exemplary Monomer: M-19

While 16.6 g of p-vinylbenzoic acid (manufactured by Wako Pure Chemical Industries, Ltd.), 80 ml of toluene, two drops of N,N-dimethylformamide were stirred at room temperature, 9.7 ml of thionyl chloride (manufactured by Wako Pure Chemical Industries, Ltd.) was added thereto, which was heated and stirred at 60° C. for 2 hours. The inside of the reaction system was cooled to 40° C., toluene and an excessive amount of thionyl chloride were removed under reduced pressure, and p-vinyl benzoic acid chloride was obtained. While 22.5 g of 2-aminoanthraquinone (manufactured by Tokyo Chemical Industry Co., Ltd.) and 110 ml of pyridine were stirred on ice, p-vinyl benzoic acid chloride was slowly added dropwise thereto. After stirring the mixture on ice for 30 minutes, the temperature was increased to 60° C. and the mixture was heat while stirring for 3 hours. Thereafter, the mixture was cooled to room temperature and water was added thereto. The resulting coarse crystals were filtrated and washed with water and methanol, and then 500 ml of methanol was added to the collected coarse crystals, and then heated while stirring at 60° C. Thereafter, the resultant crystals were separated by filtration, washed with methanol and dried. Thus, 20.1 g of M-19 was obtained (yield: 70%).

Synthesis of the Specific Polymer (b) (b-1)

5.0 g of the exemplary monomer M-4 as a monomer that forms the repeating unit of Formula (1), 20.0 g of 2-(tert-butylamino)ethylmethacrylate (manufactured by Sigma-Aldrich) as a monomer having a basic functional group, 75.0 g of AA-6 (polymethylmethacrylate macromonomer, manufactured by Toagosei Co., Ltd.) as a polymerizable oligomer, 1.6 g of dodecanethiol (manufactured by Wako Pure Chemical Industries, Ltd.) as a chain transfer agent, 180 g of methylethylketone (manufactured by Wako Pure Chemical Industries, Ltd.) were places in a nitrogen-substituted 500 ml three-necked flask. The mixture was stirred at 75° C. in a nitrogen stream for 30 minutes. Further, 0.093 g of 2,2'-azobis(isobutyric acid)dimethyl (polymerization initiator trade name: V-601, manufactured by Wako Pure Chemical Industries, Ltd.), diluted with 5.0 g of methylethylketone was added to the resulting mixture and 0.093 g of V-601 diluted with 5 g of methylethylketone every 2 hours was added thereto twice. The reaction was further continued for 2 hours and then the reaction solution was for standing to cool. 150 g of acetone was added to the reaction solution, and then the thus-diluted solution was added to 10 L of hexane in a 15 L-stainless steel container to reprecipitate the polymer. The polymer was filtrated with a nylon mesh having 100 meshes and dried overnight. Further, by drying it in a vacuum, 96 g of b-1 (specific polymer (b)) was obtained. Then, a molecular weight of the obtained polymer powder was measured by GPC. As a result, it was confirmed that the molecular weight was 17,000 in polystyrene equivalent.

Synthesis of the Specific Polymers (b) b-2 to b-6 and Comparative Polymers 1 to 5

The specific polymers (b) b-2 to b-6 and the comparative polymers 1 to 5 were respectively synthesized in the same manner as the synthesis of the specific polymer (b) b-1 except that types and amounts of the monomer that forms the repeating unit of Formula (1), the monomer having a basic functional group, and the polymerizable oligomer in the synthesis of the specific polymer (b) b-1 as well as amounts of the chain transfer agent and the polymerization initiator were changed as shown in Table 1. However, in the comparative polymer 5, the solvent-solubility of the monomer M-4 that foams the repeating unit of Formula (1) was low, the reaction in a homogeneous system might not be performed, and thus consideration was stopped.

In Table 1, tBuAEMA is 2-(tert-butylamino)ethylmethacrylate and DMAPAAm is 3-(dimethylaminopropyl)acrylamide (manufactured by Wako Pure Chemical Industries, Ltd.). Further, 9-vinylcarbazole that is a product of Tokyo Chemical Industry Co., Ltd. was used.

TABLE 1

| Type of specific polymer | Monomer to form the repeating unit of Formula (1) Type | Amount (g) | Monomer having a basic functional group Type | Amount (g) | Polymerizable oligomer Type | Amount (g) | Polymerization initiator (V-601) Amount at one time (g) | Chain transfer agent (dodecanethiol) Amount (g) | Weight average molecular weight |
|---|---|---|---|---|---|---|---|---|---|
| b-1 | M-4 | 5 | tBuAEMA | 20 | N-1 | 75 | 0.093 | 1.6 | 17000 |
| b-2 | M-4 | 10 | tBuAEMA | 10 | N-1 | 80 | 0.024 | 0.11 | 78000 |
| b-3 | M-4 | 10 | tBuAEMA | 15 | N-1 | 75 | 0.25 | 0 | 179000 |
| b-4 | M-17 | 30 | DMAEMA | 20 | N-1 | 50 | 0.51 | 0 | 80000 |
| b-5 | M-10 | 10 | tBuAEMA | 20 | N-1 | 70 | 1.51 | 0 | 110000 |
| b-6 | M-19 | 5 | tBuAEMA | 20 | N-1 | 70 | 2.39 | 0 | 130000 |
| Comparative polymer 1 | M-4 | 0 | tBuAEMA | 20 | N-1 | 80 | 0.064 | 0.28 | 120000 |
| Comparative polymer 2 | M-4 | 10 | tBuAEMA | 10 | N-1 | 80 | 0.35 | 3.1 | 8000 |
| Comparative polymer 3 | M-4 | 10 | tBuAEMA | 10 | N-1 | 80 | 0.09 | 0 | 300000 |

TABLE 1-continued

| Type of specific polymer | Monomer to form the repeating unit of Formula (1) Type | Amount (g) | Monomer having a basic functional group Type | Amount (g) | Polymerizable oligomer Type | Amount (g) | Polymerization initiator (V-601) Amount at one time (g) | Chain transfer agent (dodecanethiol) Amount (g) | Weight average molecular weight |
|---|---|---|---|---|---|---|---|---|---|
| Comparative polymer 4 | M-4 | 1 | tBuAEMA | 20 | N-1 | 79 | 0.25 | 0 | 154000 |
| Comparative polymer 5 | M-4 | 35 | tBuAEMA | 10 | N-1 | 80 | 0.5 | 0 | — |

Examples 1 to 10, Comparative Examples 1 to 11

Preparation of Mill Bases 1 to 18

The specific polymer (b) and specific graft copolymer (c) were dissolved in a dispersion medium (propoxylated neopentyl glycol diacrylate SR9003 (trade name: NPGPODA, manufactured by Sartomer Company Inc.)) and the resulting mixture was dispersed together with the pigment (a) at a peripheral speed of 9.0 m/s for 2 hours using a bead mill (trade name: MOTORMILL M50, manufactured by Eiger Co., Ltd. beads: zirconia beads with a diameter 0.65 mm) to obtain mill bases 1 to 21 with the composition shown in Table 2 which were the pigment dispersions of Examples 1 to 10 and Comparative examples 1 to 10.

In Table 2, RT-355 is a quinacridone pigment PR42 (trade name: Cinquacia Red RT-355D, manufactured by Ciba Specialty Chemicals Ltd), the specific graft copolymer (c) sol32000 is Solsperse32000, manufactured by Lubrizol Corporation, and sol24000SC is Solsperse24000SC (manufactured by Lubrizol Corporation). Although the comparative polymers 1 to 4 did not satisfy the requirements for the specific polymer (b), they were used for comparison and described in a column (b) for convenience. Further, the content of the specific polymer (b) and the specific graft copolymer (c) is based on 100 parts by mass of the pigment. ((B)/(C)) represents the value ((B)/(C)) obtained by dividing the content (B) of the specific polymer (b) or the comparative polymer by the content (C) of the specific graft copolymer (c). Further, since denominator of the value ((B)/(C)) of Comparative example 5 is 0, the value ((B)/(C)) is indicated by the "--" mark.

TABLE 2

Composition of mill base

| | Type of mill base | Pigment (a) Type | Pigment (a) Content (% by mass) | Specific polymer (b) or comparative polymer Type | Specific polymer (b) or comparative polymer Content (vs pigment) parts by mass | Specific graft copolymer (c) Type | Specific graft copolymer (c) Content (vs pigment) parts by mass | Content of dispersion medium (% by mass) | ((B)/(C)) |
|---|---|---|---|---|---|---|---|---|---|
| Example 1 | Mill base 1 | RT-355D | 10 | b-1 | 20 | sol32000 | 40 | 84 | 0.5 |
| Example 2 | Mill base 2 | RT-355D | 30 | b-1 | 10 | sol32000 | 50 | 52 | 0.2 |
| Example 3 | Mill base 3 | RT-355D | 30 | b-1 | 30 | sol32000 | 15 | 56.5 | 2 |
| Example 4 | Mill base 4 | RT-355D | 30 | b-1 | 25 | sol32000 | 20 | 56.5 | 1.25 |
| Example 5 | Mill base 5 | RT-355D | 35 | b-1 | 20 | sol32000 | 35 | 45.75 | 0.57 |
| Example 6 | Mill base 6 | RT-355D | 30 | b-2 | 20 | sol32000 | 35 | 53.5 | 0.57 |
| Example 7 | Mill base 7 | RT-355D | 30 | b-3 | 20 | sol32000 | 35 | 53.5 | 0.57 |
| Example 8 | Mill base 8 | RT-355D | 30 | b-4 | 20 | sol24000SC | 20 | 58 | 1 |
| Example 9 | Mill base 9 | RT-355D | 20 | b-5 | 10 | sol32000 | 30 | 72 | 0.33 |
| Example 10 | Mill base 10 | RT-355D | 20 | b-6 | 10 | sol32000 | 30 | 72 | 0.33 |
| Comparative example 1 | Mill base 11 | RT-355D | 30 | Comparative polymer 1 | 10 | sol32000 | 25 | 59.9 | 0 |
| Comparative example 2 | Mill base 12 | RT-355D | 30 | Comparative polymer 2 | 10 | sol32000 | 25 | 59.5 | 0 |
| Comparative example 3 | Mill base 13 | RT-355D | 30 | Comparative polymer 3 | 10 | sol32000 | 25 | 59.5 | 0 |
| Comparative example 4 | Mill base 14 | RT-355D | 30 | Comparative polymer 4 | 10 | sol32000 | 25 | 59.5 | 0 |
| Comparative example 5 | Mill base 15 | RT-355D | 30 | b-3 | 30 | — | 0 | 61 | — |
| Comparative example 6 | Mill base 16 | RT-355D | 30 | b-3 | 30 | sol32000 | 10 | 58 | 3 |
| Comparative example 7 | Mill base 17 | RT-355D | 30 | b-3 | 30 | sol32000 | 55 | 44.5 | 0.55 |
| Comparative example 8 | Mill base 18 | RT-355D | 30 | b-3 | 5 | sol32000 | 30 | 59.5 | 0.17 |
| Comparative example 9 | Mill base 19 | RT-355D | 30 | b-3 | 35 | sol32000 | 30 | 50.5 | 1.17 |

TABLE 2-continued

| | | Composition of mill base | | | | | | |
|---|---|---|---|---|---|---|---|---|
| | | Pigment (a) | | Specific polymer (b) or comparative polymer | | Specific graft copolymer (c) | | Content of |
| | Type of mill base | Type | Content (% by mass) | Type | Content (vs pigment) parts by mass | Type | Content (vs pigment) parts by mass | dispersion medium (% by mass) | ((B)/(C)) |
| Comparative example 10 | Mill base 20 | RT-355D | 30 | b-3 | 30 | sol32000 | 45 | 53.5 | 0.67 |
| Comparative example 11 | Mill base 21 | RT-355D | 40 | b-3 | 20 | sol32000 | 35 | 38 | 0.57 |

Evaluation of Mill Base

Each of the obtained mill bases was evaluated in accordance with the following valuation method.

The results are shown in Table 3.

Particle Diameter

For each mill base, cumulative 90% particle diameter D90 on the volume base was measured and evaluated by using a light scattering diffraction type grain size distribution measuring equipment (LA910, manufactured by Horiba Inc.). The evaluation criteria thereof are as shown below.

A: D90 is less than 250 nm.
B: D90 is in the range of from 250 nm to less than 500 nm.
C: D90 is 500 nm or more.

Fluidity

During the dispersion of a mill base, the mill base circulating in a circulation pipe and a hopper was observed. The evaluation criteria thereof are shown below.

Criteria

A: Fluidity of the mill base is favorable and the mill base smoothly circulates in the hopper.
B: The mill base circulates and flows from the circulation pipe; however, viscosity is high and some of the mill base accumulates in the hopper.
C: The mill base does not circulate and does not flow from the circulation pipe.

Increase in Viscosity After Dispersion

After dispersing each mill, 25 ml of the dispersion was transferred to a 50 ml volume beaker and was left as it was at room temperature for 1 hour. Then, the fluidity of the mill base was ascertained. The evaluation criteria thereof are shown below.

Criteria

A: The mill base maintained the same fluidity as just after dispersion
B: The mill base increased in viscosity and did not flow significantly even when a beaker was tilted, but developed fluidity when stirred.
C: The mill base increased in viscosity and did not flow even when beaker was tilted, and did not develop fluidity even when stirred.

TABLE 3

| | | Mill base performance | | |
|---|---|---|---|---|
| | Type of mill base | Particle diameter | Fluidity | Increase in viscosity after dispersion |
| Example 1 | Mill base 1 | A | A | A |
| Example 2 | Mill base 2 | A | B | A |
| Example 3 | Mill base 3 | A | B | B |
| Example 4 | Mill base 4 | A | A | A |
| Example 5 | Mill base 5 | A | A | A |
| Example 6 | Mill base 6 | A | A | A |
| Example 7 | Mill base 7 | A | B | A |
| Example 8 | Mill base 8 | A | A | B |
| Example 9 | Mill base 9 | A | B | A |
| Example 10 | Mill base 10 | A | A | B |
| Comparative example 1 | Mill base 11 | B | B | C |
| Comparative example 2 | Mill base 12 | A | B | C |
| Comparative example 3 | Mill base 13 | B | C | C |
| Comparative example 4 | Mill base 14 | B | B | C |
| Comparative example 5 | Mill base 15 | C | C | C |
| Comparative example 6 | Mill base 16 | C | C | C |
| Comparative example 7 | Mill base 17 | B | B | C |
| Comparative example 8 | Mill base 18 | C | A | C |
| Comparative example 9 | Mill base 19 | C | C | C |
| Comparative example 10 | Mill base 20 | A | C | A |
| Comparative example 11 | Mill base 21 | C | C | C |

As is apparent from Table 3, it is seen that the mill bases having a fine particle diameter and excellent fluidity were produced by using the specific polymer (b) in combination with the specific graft copolymer (c) in Examples 1 to 10 and an increase in viscosity after dispersion was also suppressed.

In contrast, as is apparent from Table 3, it is seen that in each Comparative example, such as Comparative examples 1 to 4 in which the specific polymer (b) was not used (namely a polymer not containing the repeating unit of Formula (1) was used, or the content or the weight average molecular weight of the specific polymer (b) was beyond a specified value range); such as Comparative example 5 in which the specific graft copolymer (c) was not used; or such as Comparative examples 6 to 10 in which the ratio of the specific polymer (b) or the specific graft copolymer (c) was not suitable, formation of fine particle diameter became difficult, fluidity of the mill base was reduced, and thixotropic properties were observed after dispersion. When the pigment concentration was too high as in Comparative example 11, favorable dispersion was not achieved due to high viscosity.

Examples 11 to 20, Comparative Examples 12 to 22

Preparation of Ink Compositions (Inks) 1 to 21

The mill base, the polymerizable compound, the photopolymerization initiator, the polymerization inhibitor, and the surfactant shown in Table 4 were mixed, and then the mixture was filtered under pressure with a membrane filter and inks (ink compositions) 1 to 21 in Examples 11 to 20 and Comparative examples 12 to 22 were obtained. The contents of each of the pigment, the polymerizable compound, and the organic solvent in the inks 1 to 21 are shown in Table 5.

TABLE 4

|  |  | Mill base | | Polymerizable compound | | Polymerization-prohibiting agent | | Polymerization initiator | | Surfactant KF-353 |
|---|---|---|---|---|---|---|---|---|---|---|
|  | Type of ink | Type | Amount (g) | NVC Amount (g) | FA-512A Amount (g) | ST-1 Amount (g) | MEHQ Amount (g) | TPO Amount (g) | Benzophenone Amount (g) | Amount (g) |
| Example 11 | Ink 1 | Mill base 1 | 45 | 25 | 16.4 | 0.3 | 1 | 9 | 3.2 | 0.1 |
| Example 12 | Ink 2 | Mill base 2 | 15 | 30 | 41.4 | 0.3 | 1 | 9 | 3.2 | 0.1 |
| Example 13 | Ink 3 | Mill base 3 | 15 | 30 | 41.4 | 0.3 | 1 | 9 | 3.2 | 0.1 |
| Example 14 | Ink 4 | Mill base 4 | 15 | 30 | 41.4 | 0.3 | 1 | 9 | 3.2 | 0.1 |
| Example 15 | Ink 5 | Mill base 5 | 12.9 | 30 | 43.5 | 0.3 | 1 | 9 | 3.2 | 0.1 |
| Example 16 | Ink 6 | Mill base 6 | 15 | 30 | 41.4 | 0.3 | 1 | 9 | 3.2 | 0.1 |
| Example 17 | Ink 7 | Mill base 7 | 15 | 30 | 41.4 | 0.3 | 1 | 9 | 3.2 | 0.1 |
| Example 18 | Ink 8 | Mill base 8 | 15 | 30 | 41.4 | 0.3 | 1 | 9 | 3.2 | 0.1 |
| Example 19 | Ink 9 | Mill base 9 | 22.5 | 30 | 33.9 | 0.3 | 1 | 9 | 3.2 | 0.1 |
| Example 20 | Ink 10 | Mill base 10 | 22.5 | 30 | 33.9 | 0.3 | 1 | 9 | 3.2 | 0.1 |
| Comparative example 12 | Ink 11 | Mill base 11 | 15 | 30 | 41.4 | 0.3 | 1 | 9 | 3.2 | 0.1 |
| Comparative example 13 | Ink 12 | Mill base 12 | 15 | 30 | 41.4 | 0.3 | 1 | 9 | 3.2 | 0.1 |
| Comparative example 14 | Ink 13 | Mill base 13 | 15 | 30 | 41.4 | 0.3 | 1 | 9 | 3.2 | 0.1 |
| Comparative example 15 | Ink 14 | Mill base 14 | 15 | 30 | 41.4 | 0.3 | 1 | 9 | 3.2 | 0.1 |
| Comparative example 16 | Ink 15 | Mill base 15 | 15 | 30 | 41.4 | 0.3 | 1 | 9 | 3.2 | 0.1 |
| Comparative example 17 | Ink 16 | Mill base 16 | 15 | 30 | 41.4 | 0.3 | 1 | 9 | 3.2 | 0.1 |
| Comparative example 18 | Ink 17 | Mill base 17 | 15 | 30 | 41.4 | 0.3 | 1 | 9 | 3.2 | 0.1 |
| Comparative example 19 | Ink 18 | Mill base 18 | 15 | 30 | 41.4 | 0.3 | 1 | 9 | 3.2 | 0.1 |
| Comparative example 20 | Ink 19 | Mill base 19 | 15 | 30 | 41.4 | 0.3 | 1 | 9 | 3.2 | 0.1 |
| Comparative example 21 | Ink 20 | Mill base 20 | 15 | 30 | 41.4 | 0.3 | 1 | 9 | 3.2 | 0.1 |
| Comparative example 22 | Ink 21 | Mill base 21 | 11.25 | 30 | 45.15 | 0.3 | 1 | 9 | 3.2 | 0.1 |

In Table 4, NVC is N-vinyl-ε-caprolactam (manufactured by BASF Co.), FA-512A is dicyclopentenyloxyethylacrylate (manufactured by Hitachi Chemical Co., Ltd.), ST-1 is FIRSTCURE ST-1 (manufactured by Chem First), MEHQ is p-methoxyphenol (manufactured by Wako Pure Chemical Industries, Ltd.), TPO is Lucirin TPO (manufactured by BASF Co.), benzophenone is manufactured by Wako Pure Chemical Industries, Ltd., and KF-353 is a silicone surfactant (manufactured by Shin-Etsu Chemical Co., Ltd.).

TABLE 5

|  | Types of inks | Content of the pigment (a) (% by mass) | Content of the polymerizable compound (d) |
|---|---|---|---|
| Example 11 | Ink 1 | 4.5 | 79.2 |
| Example 12 | Ink 2 | 4.5 | 79.2 |
| Example 13 | Ink 3 | 4.5 | 79.9 |
| Example 14 | Ink 4 | 4.5 | 79.9 |
| Example 15 | Ink 5 | 4.5 | 79.4 |
| Example 16 | Ink 6 | 4.5 | 79.4 |
| Example 17 | Ink 7 | 4.5 | 79.4 |
| Example 18 | Ink 8 | 4.5 | 80.1 |
| Example 19 | Ink 9 | 4.5 | 80.1 |
| Example 20 | Ink 10 | 4.5 | 80.1 |
| Comparative example 12 | Ink 11 | 4.5 | 80.3 |
| Comparative example 13 | Ink 12 | 4.5 | 80.3 |
| Comparative example 14 | Ink 13 | 4.5 | 80.3 |
| Comparative example 15 | Ink 14 | 4.5 | 80.3 |
| Comparative example 16 | Ink 15 | 4.5 | 80.6 |
| Comparative example 17 | Ink 16 | 4.5 | 80.1 |
| Comparative example 18 | Ink 17 | 4.5 | 78.1 |
| Comparative example 19 | Ink 18 | 4.5 | 80.3 |
| Comparative example 20 | Ink 19 | 4.5 | 79.0 |
| Comparative example 21 | Ink 20 | 4.5 | 78.5 |
| Comparative example 22 | Ink 21 | 4.5 | 79.4 |

Evaluation of Inks 1 to 21

The obtained inkjet inks 1 to 21 were evaluated in accordance with the following valuation method. The results are shown in Table 6.

Viscosity

The viscosity at 25° C. for each ink was measured using an E-type viscometer (manufactured by TOKI SANGYO CO., LTD.) and evaluated by the following criteria.

Criteria
A: less than 30 mPas
B: 30 mPas or more and less than 40 mPas
C: 40 mPas or more (problematic level in view of dischargeability).

Stability

The dispersion state of each ink after one-month storage at 25° C. and after one-week storage at 60° C. was evaluated based on the viscosity. The evaluation criteria are as follow.

Criteria
A: Increase in viscosity is less than 5%, which is not at all a problematic level in discharge stability.
B: Increase in viscosity is in the range of from 5% to less than 10%, which is a level of lowering the discharge stability.
C: Increase in viscosity is 10% or more, which is a level of remarkably lowering the discharge stability.

Dischargeability

The ink composition was continuously discharged at 45° C. for 60 minutes from a JetLyzer (manufactured by MIMAKI ENGINEERING CO., LTD.) equipped with an inkjet print head CA3 (manufactured by Toshiba TEC Corporation) after setting at a discharge voltage of 22 V and a discharge drop number of 7 drops and evaluated by the following criteria.

Criteria
A: Spotting of droplets is carried out normally or a small amount of mist was generated, which is not at all a problematic level in practice in terms of dischargeability.
B: Mist generation is observed and inkjet dischargeability is slightly poor.
C: Heavy mist generation is observed and the inkjet dischargeability is poor.

TABLE 6

| | Type of mill | IJ ink performance (after dilution) | | |
|---|---|---|---|---|
| | base | Viscosity | Stability | Dischargeability |
| Example 11 | Ink 1 | A | A | A |
| Example 12 | Ink 2 | A | B | A |
| Example 13 | Ink 3 | A | B | B |
| Example 14 | Ink 4 | A | A | A |
| Example 15 | Ink 5 | A | A | A |
| Example 16 | Ink 6 | A | A | A |
| Example 17 | Ink 7 | A | B | A |
| Example 18 | Ink 8 | A | A | B |
| Example 19 | Ink 9 | A | B | A |
| Example 20 | Ink 10 | A | A | B |
| Comparative example 12 | Ink 11 | B | B | C |
| Comparative example 13 | Ink 12 | A | B | C |
| Comparative example 14 | Ink 13 | B | C | C |
| Comparative example 15 | Ink 14 | B | B | C |
| Comparative example 16 | Ink 15 | C | C | C |
| Comparative example 17 | Ink 16 | C | C | C |
| Comparative example 18 | Ink 17 | B | B | C |
| Comparative example 19 | Ink 18 | C | A | C |
| Comparative example 20 | Ink 19 | C | C | C |
| Comparative example 21 | Ink 20 | A | C | A |

TABLE 6-continued

| | Type of mill | IJ ink performance (after dilution) | | |
|---|---|---|---|---|
| | base | Viscosity | Stability | Dischargeability |
| Comparative example 22 | Ink 21 | C | C | C |

As is apparent from Table 6, in Examples 11 to 20, it is seen that the inks excellent in initial viscosity, stability and dischargeability were obtained. It is found that these inks are also excellent in image sharpness.

In contrast, respective Comparative examples were inferior to Examples 11 to 20 in viscosity, stability and dischargeability. This suggests that the inkjet inks of respective Comparative examples were insufficient in pigment dispersibility.

Thus, it is seen that the pigment dispersion of the invention using the specific polymer (b) in combination with the specific graft copolymer (c) is excellent in the dispersibility of the pigment, and even when the pigment dispersion is used as an inkjet ink, ink stability and excellent inkjet dischargeability are obtained because of its high dispersibility.

All publications, patent applications, and technical standards mentioned in this specification are herein incorporated by reference to the same extent as if each individual publication, patent application, or technical standard was specifically and individually indicated to be incorporated by reference.

What is claimed is:

1. A pigment dispersion comprising:
   from 2 to 35% by mass of a pigment (a);
   from 10 to 30 parts by mass of a polymer (b) with respect to 100 parts by mass of the pigment (a),
   the polymer (b) comprising (i) 5 to 30% by mass of a repeating unit represented by the following Formula (1), and (ii) a repeating unit derived from N-tertbutylaminoethylmethacrylate, and the polymer (b) having a weight average molecular weight of 10000 to 200000; and
   from 15 to 50 parts by mass of a graft copolymer (c) comprising a polyalkylene imine chain or a polyallylamine chain in a main chain thereof and a polyester chain in a side chain thereof, with respect to 100 parts by mass of the pigment (a);
   wherein a total content of the polymer (b) and the graft copolymer (c) is in the range of from 25 to 70 parts by mass with respect to 100 parts by mass of the pigment (a):

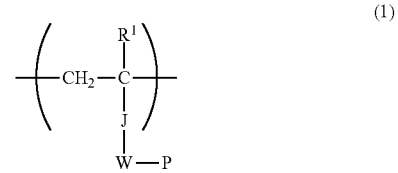

(1)

wherein, in Formula (1), $R_1$ represents a hydrogen atom or a methyl group; J represents —CO—, —COO—, —CONR$_2$—, —OCO— or a phenylene group; $R_2$ represents a hydrogen atom, an alkyl group, an aryl group or an aralkyl group; W represents a single bond or a divalent linking group; and P represents a heterocyclic residue having a heterocyclic ring contained in an organic pigment.

2. The pigment dispersion according to claim 1, wherein P in Formula (1) is a heterocyclic residue having a partial structure of a pigment selected from the group consisting of a quinacridone pigment, a benzimidazolone azo pigment, a dioxazine pigment, a naphthol AS pigment, a phthalocyanine pigment, an anthraquinone pigment, and a perylene pigment, and containing a structure in which 2 to 5 heterocyclic rings are fused.

3. The pigment dispersion according to claim 2, wherein P in Formula (1) is a heterocyclic residue having 7 to 20 carbon atoms.

4. The pigment dispersion according to claim 2, wherein the partial structure is a partial structure selected from the group consisting of benzimidazolone, carbazole, acridone, anthraquinone, phthalimide, and naphthalimide.

5. The pigment dispersion according to claim 1, wherein the polymer (b) comprises a repeating unit comprising a polymerizable oligomer.

6. The pigment dispersion according to claim 1, wherein the pigment (a) comprises a quinacridone pigment.

7. The pigment dispersion according to claim 6, wherein P in Formula (1) is a heterocyclic residue having a heterocyclic ring with an identical or similar structure to a heterocyclic ring included in quinacridone.

8. The pigment dispersion according to claim 1, wherein a value ((B)/(C)) obtained by dividing a content (B) of the polymer (b) by a content (C) of the graft copolymer (c) is in a range of from 0.2 to 1.3.

9. The pigment dispersion according to claim 1, further comprising a radically polymerizable monomer (d).

10. An ink composition which comprises the pigment dispersion according to claim 1.

11. The ink composition according to claim 10, which further comprises 50 to 95% by mass of at least one of a radically polymerizable monomer (d) or an organic solvent (e), and a content of the pigment (a) is in a range of from 2 to 20% by mass.

12. A composition for inkjet printing comprising the ink composition according to claim 10.

13. The ink composition according to claim 10, further comprising a polymerization initiator.

14. A printed material produced by printing on a recording medium with an inkjet printer using the ink composition according to claim 12.

15. The pigment dispersion according to claim 1, wherein the pigment dispersion does not contain a volatile solvent.

16. A pigment dispersion comprising:
from 2 to 35% by mass of a pigment (a);
from 10 to 30 parts by mass of a polymer (b) with respect to 100 parts by mass of the pigment (a), the polymer (b) comprising (i) 5 to 30% by mass of a first repeating unit represented by the following Formula (1), (ii) a second repeating unit derived from N-tertbutylaminoethylmethacrylate, and (iii) a third repeating unit comprising a polymerizable oligomer, and the polymer (b) having a weight average molecular weight of 10000 to 200000; and from 15 to 50 parts by mass of a graft copolymer (c) comprising a polyalkylene imine chain or a polyallylamine chain in a main chain thereof and a polyester chain in a side chain thereof, with respect to 100 parts by mass of the pigment (a);
wherein a total content of the polymer (b) and the graft copolymer (c) is in the range of from 25 to 70 parts by mass with respect to 100 parts by mass of the pigment (a):

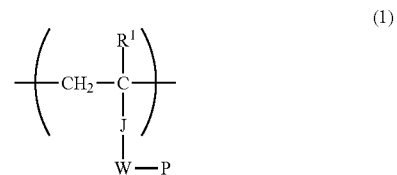

wherein, in Formula (I), $R_1$ represents a hydrogen atom or a methyl group; J represents —CO—, —COO—, —CONR$_2$—, —OCO— or a phenylene group; $R_2$ represents a hydrogen atom, an alkyl group, an aryl group or an aralkyl group; W represents a single bond or a divalent linking group; and P represents a heterocyclic residue having a heterocyclic ring contained in an organic pigment.

17. The pigment dispersion according to claim 16, wherein P in Formula (1) is a heterocyclic residue having a partial structure of a pigment selected from the group consisting of a quinacridone pigment, a benzimidazolone azo pigment, a dioxazine pigment, a naphthol AS pigment, a phthalocyanine pigment, an anthraquinone pigment, and a perylene pigment, and containing a structure in which 2 to 5 heterocyclic rings are fused.

18. The pigment dispersion according to claim 17, wherein the partial structure is a partial structure selected from the group consisting of benzimidazolone, carbazole, acridone, anthraquinone, phthalimide, and naphthalimide.

19. The pigment dispersion according to claim 16, wherein a value ((B)/(C)) obtained by dividing a content (B) of the polymer (b) by a content (C) of the graft copolymer (c) is in a range of from 0.2 to 1.3.

20. The pigment dispersion according to claim 16, further comprising a radically polymerizable monomer (d).

21. The pigment dispersion according to claim 16, wherein the pigment dispersion does not contain a volatile solvent.

22. An ink composition which comprises the pigment dispersion according to claim 16.

23. An ink composition for inkjet printing comprising the ink composition according to claim 22.

24. A printed material produced by printing on a recording medium with an inkjet printer using the ink composition according to claim 23.

* * * * *